United States Patent [19]

Panec

[11] Patent Number: 5,957,693

[45] Date of Patent: Sep. 28, 1999

[54] APPARATUS FOR SHARED READING

[75] Inventor: Donald J. Panec, Redwood City, Calif.

[73] Assignee: Treasure Bay, S. San Francisco, Calif.

[21] Appl. No.: 08/905,439

[22] Filed: Aug. 4, 1997

[51] Int. Cl.$^6$ .................................................. G09B 17/00
[52] U.S. Cl. ............................................................ 434/178
[58] Field of Search ................................... 434/178, 156, 434/157; 283/46

[56] References Cited

U.S. PATENT DOCUMENTS

| | | |
|---|---|---|
| 1,353,371 | 9/1920 | Winslow . |
| 3,680,229 | 8/1972 | Serrie et al. . |
| 3,754,778 | 8/1973 | Lenahan ................................. 283/38 |
| 4,008,529 | 2/1977 | Yorkston . |
| 4,196,529 | 4/1980 | Esbensen . |
| 4,636,173 | 1/1987 | Mossman . |
| 4,891,011 | 1/1990 | Cook ...................................... 434/157 |
| 5,033,964 | 7/1991 | Phelps . |
| 5,338,201 | 8/1994 | Levine . |
| 5,421,731 | 6/1995 | Walker . |
| 5,447,439 | 9/1995 | Nathanson . |
| 5,451,163 | 9/1995 | Black . |
| 5,486,111 | 1/1996 | Watkins . |
| 5,529,496 | 6/1996 | Barrett . |
| 5,567,159 | 10/1996 | Tehan . |
| 5,597,968 | 1/1997 | Okamoto . |
| 5,618,180 | 4/1997 | Nathanson . |

OTHER PUBLICATIONS

Criscoe, Betty L. et al., "Fairy Tales for Two Readers", Teacher Idea Press, Englewood, Colorado, 1995.

Puddle Lane: When the Magic Stopped, by Sheila McCullagh, published by Ladybird Books, Loughborough, England 1985.

*Primary Examiner*—Jeffrey A. Smith
*Attorney, Agent, or Firm*—Kolisch, Hartwell, Dickinson, McCormack & Heuser

[57] ABSTRACT

The invention is a method for promoting reading in a novice reader and a book to be used in the method. The book includes a story with two texts, one written at a reading level appropriate for a skilled reader and the other written at a lower reading level appropriate for the novice reader. The texts are arranged in alternating sections and each section forms a piece of the story and supplements the preceding section. In the method, the skilled reader and novice reader take turns reading aloud from the book while the other follows along with the words, so that each reader is responsible for reading a substantial portion of the story. The method and the book thus provide for a shared reading experience that is advantageous for encouraging and facilitating the novice reader to learn to read.

18 Claims, 42 Drawing Sheets

Once upon a time there lived an emperor.
He was a rich emperor.
He was a handsome emperor.
But most of all, he was a well-dressed emperor.

He could often be found strutting through his town, blowing kisses and showing off what a well-dressed emperor he was.

Fred was the emperor's faithful old servant.
He was sure to be able to see the cloth.
For Fred was a good worker. And Fred was no fool.

That afternoon Fred went into the weaving room
and looked down at the loom.

And Fred saw nothing at all.

Now the emperor wanted to go look at it even more.

"I have to go see it.
I want to! I do!
But if I *don't* see it,
then am I a fool?"

He sent Ted instead.

Each trusted servant sang the praises of the cloth he did not see.

The emperor agreed.

He turned to the weavers and instructed them to make him a new set of clothes from the cloth.
And, by the wearing, would learn who in his town was a fool.

APPARATUS FOR SHARED READING

FIELD OF THE INVENTION

The present invention relates generally to a method for reading and to books used in the method. More specifically, the invention concerns books containing alternating sections of text written at two different reading levels, so two readers with different reading abilities can together read a story.

BACKGROUND

An important part of helping a child learn to read is for a teacher, a parent, or other skilled reader to read a story to the child. It is known that the child is aided in learning to read by following along with the words as the skilled reader reads them, especially when the skilled reader points to each word as it is read. In this manner, the child learns to read words by associating the appearance or spelling of each word with the spoken sound of the word. Such recognizing of entire words may be assisted by associated pictures representing one or more of the words.

A child also reads words by learning phonemes, which are the sounds of letters and combinations of letters. Knowing phonemes, the child may then sound out words phonetically, one phoneme at a time, in order to read each word. As the child begins to learn how to recognize or sound out simple words, the learning is reinforced by the child's reading aloud as the skilled reader listens and helps the child, praising the successful sounding-out and word recognition and guiding the child through difficulties.

Some children quickly learn to read and these children generally enjoy the experience of shared reading with a skilled reader and easily progress from simple sounds and words to complex reading. Other children struggle to learn reading even when the skilled reader shares the reading with the child, and the child may develop an aversion to books due to a high level of frustration experienced with books. For the struggling child reader, it is crucial that experiences with reading be as enjoyable as possible. Nevertheless, both types of children can be aided in learning to read by reading together with a skilled reader.

Currently existing books are not designed to optimize the learning potential of shared reading between skilled and novice readers. Books are written with a single text providing a story. The text is at a single reading level for either a skilled reader or a novice reader to read, but it is not designed for both to read. A slightly different approach is provided by a series of books published by Ladybird Books which includes a text for a skilled reader to read to a child. The books also provide a series of pictures, each with an associated excerpt taken verbatim from the skilled reader's text. After reading the book through once, the skilled reader is instructed to review the pictures and excerpts with the child and help the child to attempt to read the excerpts, which, of course, the child has just been read in the context of the skilled reader's reading. However, this scheme does not truly provide for a shared experience between the skilled reader and the child in reading the story, because they do not read the story together. The skilled reader reads the entire book solo and thereafter the child is given an opportunity to read solo. The child's reading portions contribute nothing additional to the story, but, instead are just repeats of the skilled reader's portions. A need exists for a book that provides for encouragement and facilitation to the child to learn reading in a experience with a skilled reader.

SUMMARY OF INVENTION

The present invention solves these shortcomings of the prior art by providing a book with a story developed through two alternating and interwoven texts. One text is written at a higher skill level for a skilled reader, the other text is written at a lower skill level for a child or novice reader to read. The skilled reader's text uses advanced words and grammatical constructions providing the more articulate passages of the story. The child's text, on the other hand, is specifically designed for a beginning reader and, thus, uses simpler words that are within the child's skill level. For example, for the earliest beginning readers, the words used in the child's text primarily come from a list of a few hundred words that are believed to be among the first words that the beginning reader learns to recognize. The child's text also uses a simpler grammatical construction, for example, short sentences in repetitive lines with only a single word changing from one line to the next. For children with a higher, but still progressing, skill level, the child's text is advanced to include primarily the words and grammatical constructions believed to be appropriate for the higher skill level.

However, the reading of the child's text is not relegated to a secondary status below that of the skilled reader's. The child's text provides important or necessary elements of the story. For example, new characters or actions are introduced in the child's text. In this manner, although the child's text is easy to read, the reading of it is just as important to the story as the reading of the skilled reader's text. The skilled reader may communicate this fact to the child to provide further encouragement in the child's reading endeavors. The child's text is identified as the child's own by an identifying indicia, such as bolding the typeface or placing the child's text within a specified area of a page or within special borders.

A main advantage of the alternating, interwoven text is that it provides a shared reading experience that increases the enjoyment, and therefore the learning potential, of reading. The child is helped to learn words beyond the child's current skill level as the skilled reader reads and points to the skilled reader's text. Then, the child reads the child's text, helped and encouraged by the skilled reader. The child's text is not too challenging to frustrate the child, yet, at the same time, the child's text forms a crucial element in an interesting, challenging story. The skilled reader and the child alternate back and forth in relatively short periods, ensuring that the child feels neither overburdened nor left out.

Another advantage is to provide the child with a story to be read, a portion of which is readily identifiable by the child, through the indicia applied to the child's text, as the child's responsibility to read. The indicia lets the child know at a glance which portion is the child's. When the child reads this portion, the esteem the child will feel as part of a reading team will be increased by the skilled reader's recognition of the child as contributing critically to the reading of the story.

These and other objects and advantages of the invention will be more fully understood by reference to the accompanying drawings and the detailed description to follow.

DETAILED DESCRIPTION OF THE PREFERRED EMBODIMENT

Figure 1:
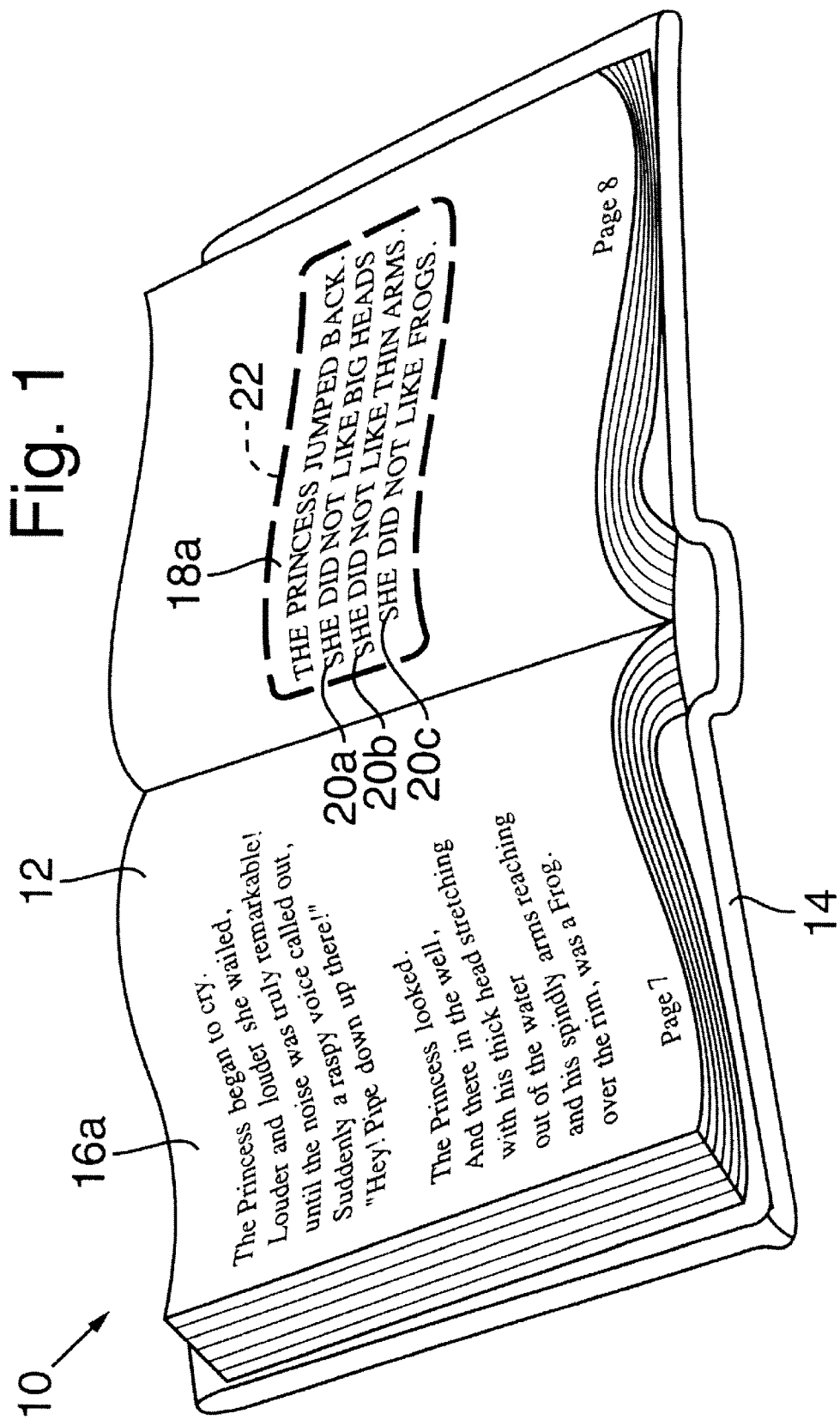
FIG. 1 is a perspective view of a book of the present invention, showing a portion of a story presented on a pair of opposing pages with a skilled reader's text on the left hand page and a child's text on the right hand page.
Figure 2:
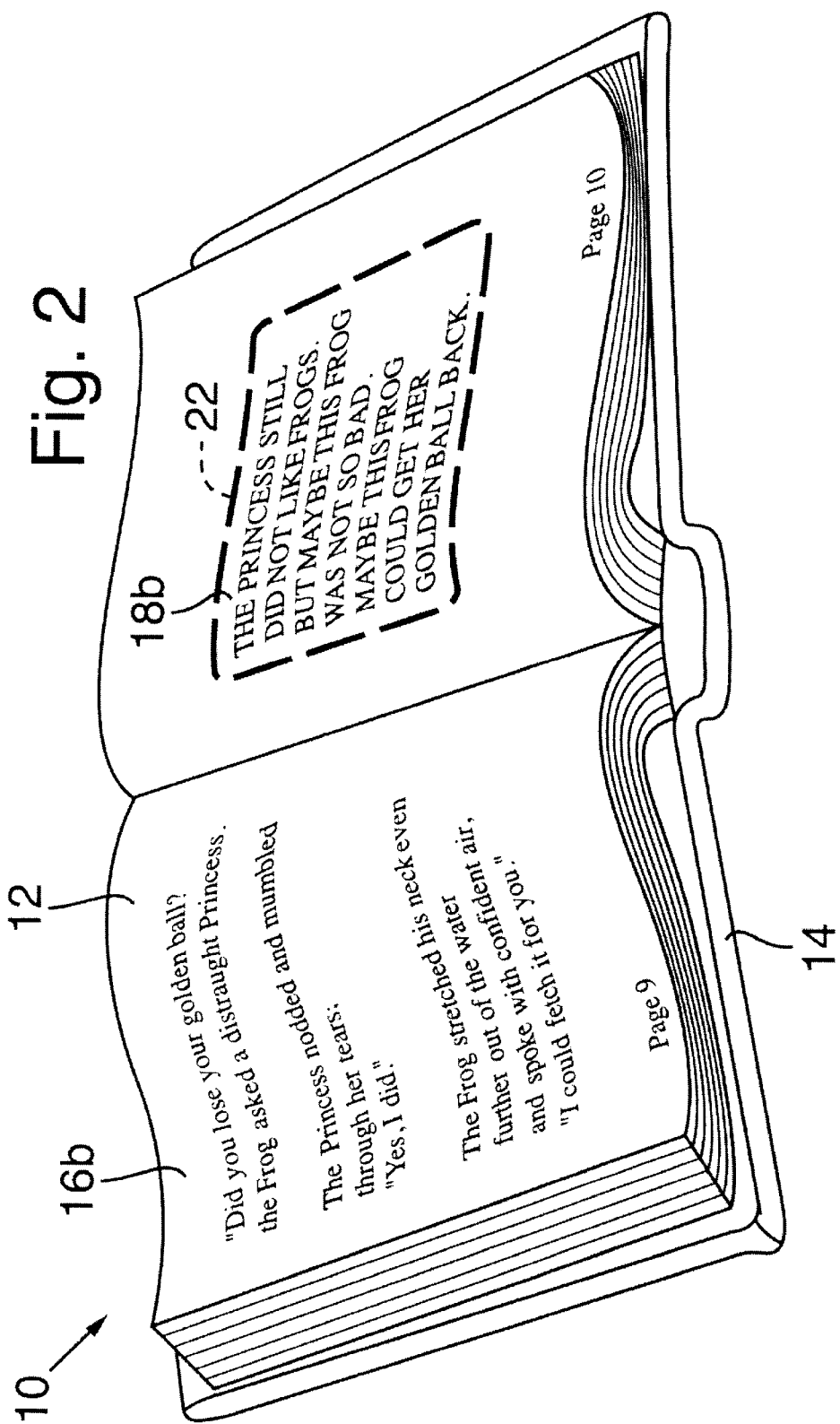
FIG. 2 is a perspective view of the book of FIG. 1, showing another pair of opposing pages.

As shown in FIGS. 1 and 2, a book of the present invention, indicated generally at 10, comprises a plurality of pages 12, printed and bound in a conventional manner in a cover 14. Each book contains at least one story and may include a series of stories. The book is preferably 9-inches tall by 6.5-inches wide and 48 pages long with 40 pages for the actual story. Other sizes and page lengths are possible.

Each story includes a first text arranged in sections 16a, b on at least a portion of the pages. The first text is written at a selected reading level appropriate for a first person, who is a skilled reader having a first reading skill, to read. As seen in FIG. 1, first text section 16a includes words having as many as four syllables, such as "remarkable," and complex sentence structure, including dependent clauses: "until the noise was truly remarkable." Such words and sentence structure are difficult to read and are beyond the ability of typical beginning readers, and so, the skilled reader will read the first text to a second person, who is a novice reader having a second, lesser reading skill than the skilled reader. Preferably, the skilled reader points to each word as it is read with the novice reader following along, observing each word as it is spoken.

Each story also includes a second text arranged in sections 18a, b on at least a portion of the pages. The second text is written at a lesser reading level than the first text and is appropriate for the skill of the novice reader. The second text contains many words with only a single syllable, as well as an occasional multi-syllabic word, especially if the same word has just been read by the skilled reader, such as "golden" in 16b and 18b. Difficult words for children are often introduced in a preceding section for the adult. These words may be "bolded" or otherwise highlighted to indicate to the skilled reader to point this word out to the novice reader during the skilled reader's reading.

As seen in FIGS. 1 and 2, sections 16a, b and 18a, b are arranged in alternating sequence, first the skilled reader's section 16a and then the novice reader's section 18a, then the skilled reader's section 16b, then novice reader's section 18b. This alternating pattern preferably begins at the beginning of the story and continues through to the end. In the story shown in FIG. 1, each novice reader's section has roughly half as many words as the preceding skilled reader's section. This ratio can be varied according to a target skill level of the novice reader, decreasing the words for the earliest beginning readers and increasing for novice readers who have already developed some reading skills. Furthermore, the novice reader's sections include fewer different words because the same words are used repeatedly, such as in lines 20a–c where "She did not like" is repeated three times. This increases the practice that the novice reader undergoes, but, at the same time, lessens the burden on the novice reader to learn new words.

The reading level of the text, or the reading skill necessary to read the text, is determined in part by analyzing the words in the text in light of lists of words. The lists, which are known in the art, are classified according to children's abilities. The lists include the common sight words for various abilities. The common sight words are those typically known by children within the various ability groups. A text written at a particular reading level, identified as the target child's reading level, uses a high percentage of words from lists associated with that ability or reading level.

FIGS. 1 and 2 also shows that the second text is not a simple, verbatim repeat of the first text, but, far to the contrary, the second text introduces new elements to the story. In this manner, the first and second texts together tell a continuous story, with the second text forming a piece of the story and supplementing the first text. For example, in FIG. 1, the skilled reader's section 16a introduces and briefly describes a Frog. The novice reader's section 18a describes a Princess' initial dislike of the Frog. Furthering the story, in FIG. 2, the skilled reader's text in section 16b presents a conversation between the Frog and the Princess, wherein it is suggested that the Frog can help the Princess to fetch a golden ball that the Princess has lost. The novice reader's text in section 18b explains the Princess's reaction to the suggestion and her resolution of her conflicting feelings of not liking the Frog, but still wanting the Frog to help her. These alternating, interwoven, interdependent sections of text together provide the continuous story that is both interesting to the novice reader and engages the novice reader in active reading. The novice's reader's involvement is much more crucial than just an occasional sounding out of an easy word within a single text. The novice reader is advantageously provided with both a chance to follow along with the skilled reader's text and to share in the reading of the novice reader's own text. Generally, the skilled reader's text carries a larger burden of advancing the story, resulting in an optimal combination of entertainment and challenge.

Books embodying the present invention may be written at a variety of reading levels, both in the skilled reader's sections and in the novice reader's sections. The stories are preferably about 1200 to 1400 words long with up to about 900 words in the skilled reader's section and up to about 500 words in the novice reader's section. Other lengths are possible depending on the target skill level of the novice reader. For the earliest beginning readers, the novice reader's sections may be written at the simplest reading levels possible and closely associated with a picture representing the words, but, the novice reader's sections will still introduce new elements to the story. For the same earliest beginning readers, the skilled reader's section may be written at a level that is only slightly above that of the novice reader's section to maximize the teaching value of the skilled reader's pointing at the words as they are read in the skilled reader's section. Alternatively, the skilled reader's section may be written at a level that is considerably above the novice reader's skill, thus maximizing the entertainment value of the skilled reader's section, possibly somewhat at the expense of the teaching value. The books may include an identifying mark (not shown) on cover 14 indicating the reading level for either or both of the skilled and/or novice reader's sections. The books may also be provided in a series of books, with each book in the series providing a different story but all at the same reading level for the skilled and novice readers' sections. Alternatively, one or both of the reading levels may increase gradually throughout the series. The books may also be provided with a vocabulary listing of all words used in either or both sections.

A method for the skilled reader to promote reading by the novice reader using the book of the present invention preferably begins with the skilled reader reading aloud one of the sections of the skilled reader's text, preferably beginning at the beginning of the story. The skilled reader preferably points at each word as it is read and the novice reader preferably follows along, learning reading by associating the sound of each word with its spelling or appearance. Then, the novice reader reads aloud the following section of the novice reader's text while the skilled reader follows along, encouraging the novice reader, correcting mistakes, as deemed appropriate, and assisting with difficulties. The skilled and novice readers then repeat the alternating reading of the skilled reader's sections and the novice reader's sections to complete the reading of both texts, and thus to share the experience of reading the story. The alternating reading thereby involves the skilled reader and the novice reader together in reading the story through each person reading a substantial portion of the story, while further allowing the novice reader both to practice reading at the novice reader's level and to observe the skilled reader reading at the skilled reader's higher reading level. The substantial portion of the story read by the novice reader is generally less than half the story or may be as little as an eighth of the story. The substantial portion may be even less than an eighth, but, it generally always includes an important event within the story.

FIGS. 1 and 2 show that the book further comprises indicia distinguishing the skilled reader's text from the novice reader's. At least one indicia is preferably applied to the texts, although several indicia are shown in FIGS. 1 and 2. One mode of indicia is to print the texts in a different type, which may include using a larger type size, using a different font, bolding one of the texts, italicizing one of the texts, or using a different color for the texts. For example, FIGS. 1–2 show the novice reader's sections 18a, b with a larger type size and with letters that are bolder than in skilled reader's sections 16a, b.

Another indicia to distinguish the texts is placement of each text on different, predetermined portions of pages. For example, in FIGS. 1–2, skilled reader's sections 16a, b are all presented on the left hand pages of the book while novice reader's sections 18a, b are all presented on the right hand pages of the book. Other predetermined portions of pages could include the skilled reader's section's being at the top or in an upper left corner of each page with the novice reader's section's being at the bottom or in a lower right corner of each page, or vice versa. Other indicia could include a graphic symbol associated with one of the texts or a different graphic symbol associated with each text. The graphic symbol could include a border around the text, underlying color or shade for the text, or leading and trailing symbols, such as stars, children's faces, adult faces, or other symbols. For example, FIGS. 1–2 show the novice reader's sections surrounded by a border 22.

Figure 3:
FIGS. 3–42 are pages 1–40, respectively, of a book prepared according to the present invention.
Figure 4:
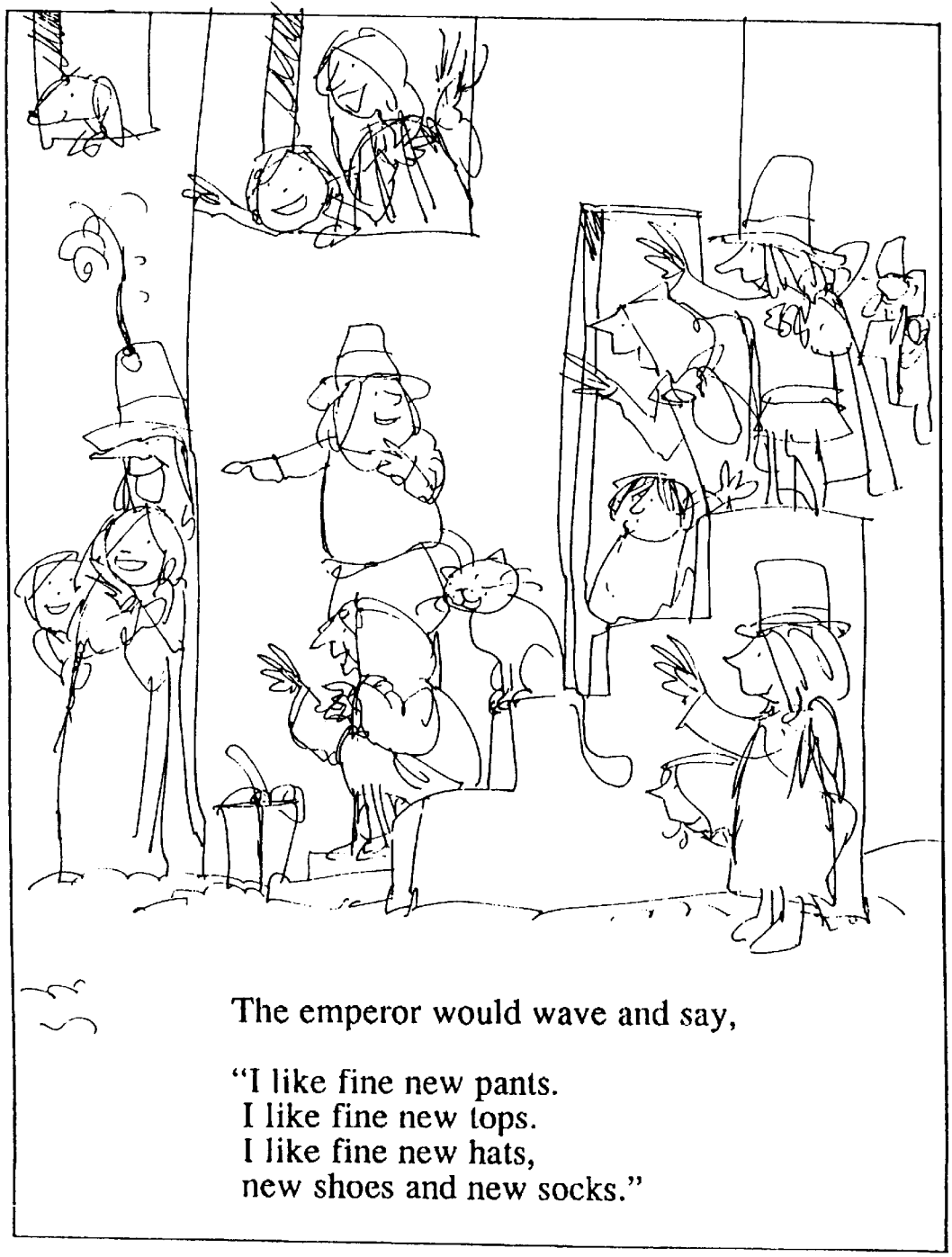
Figure 5:
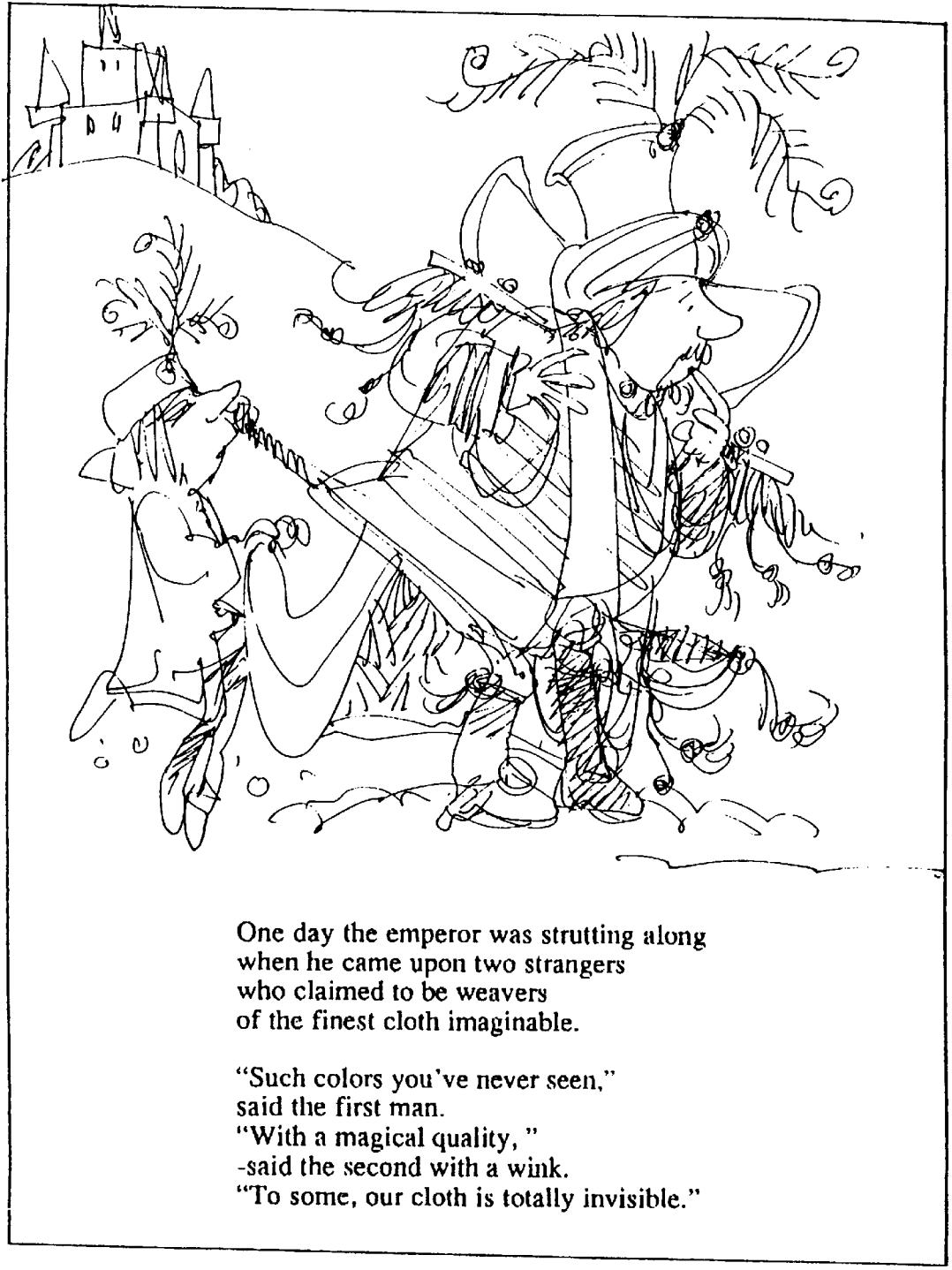
Figure 6:
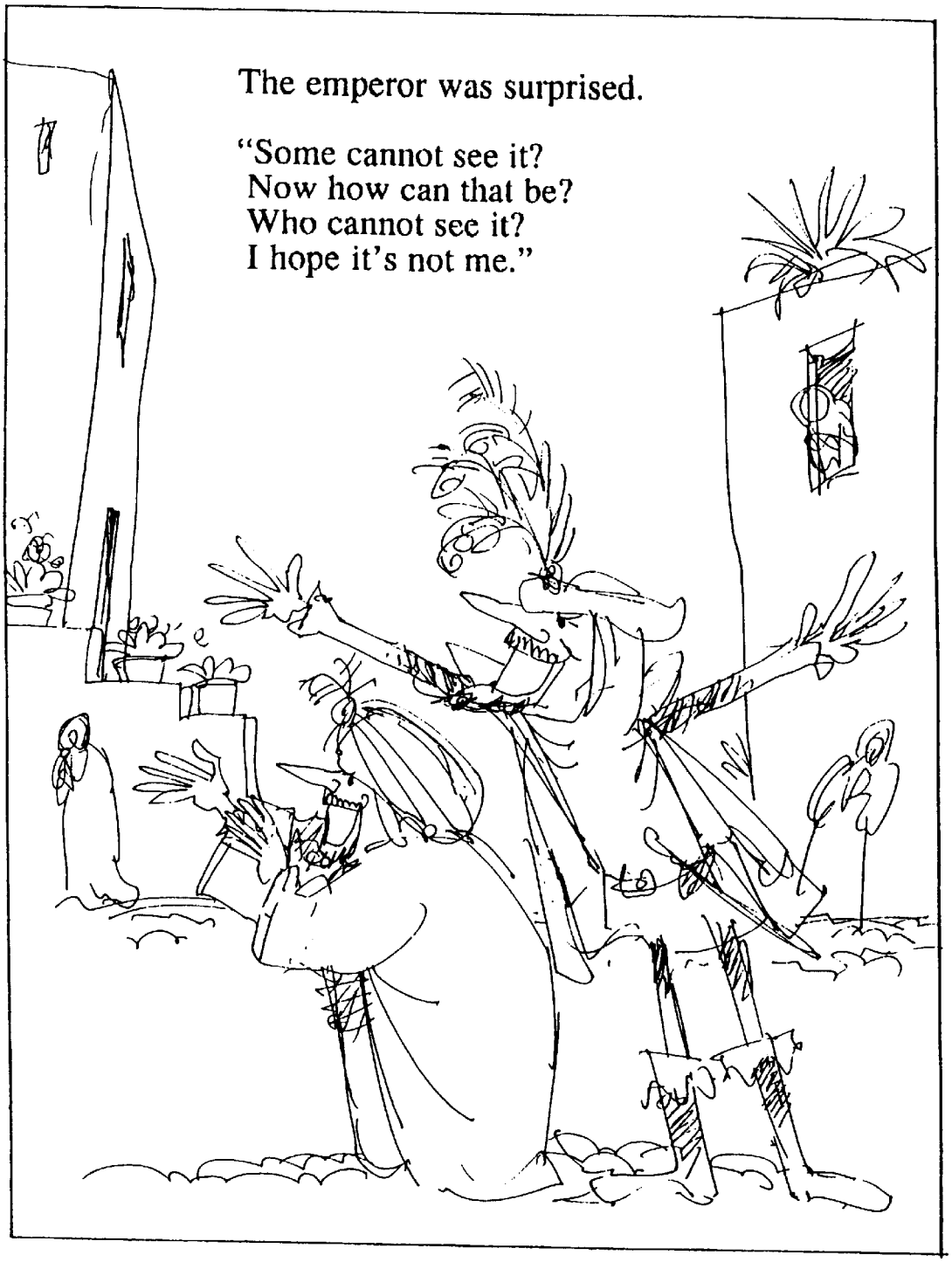
Figure 7:
Figure 8:
Figure 9:
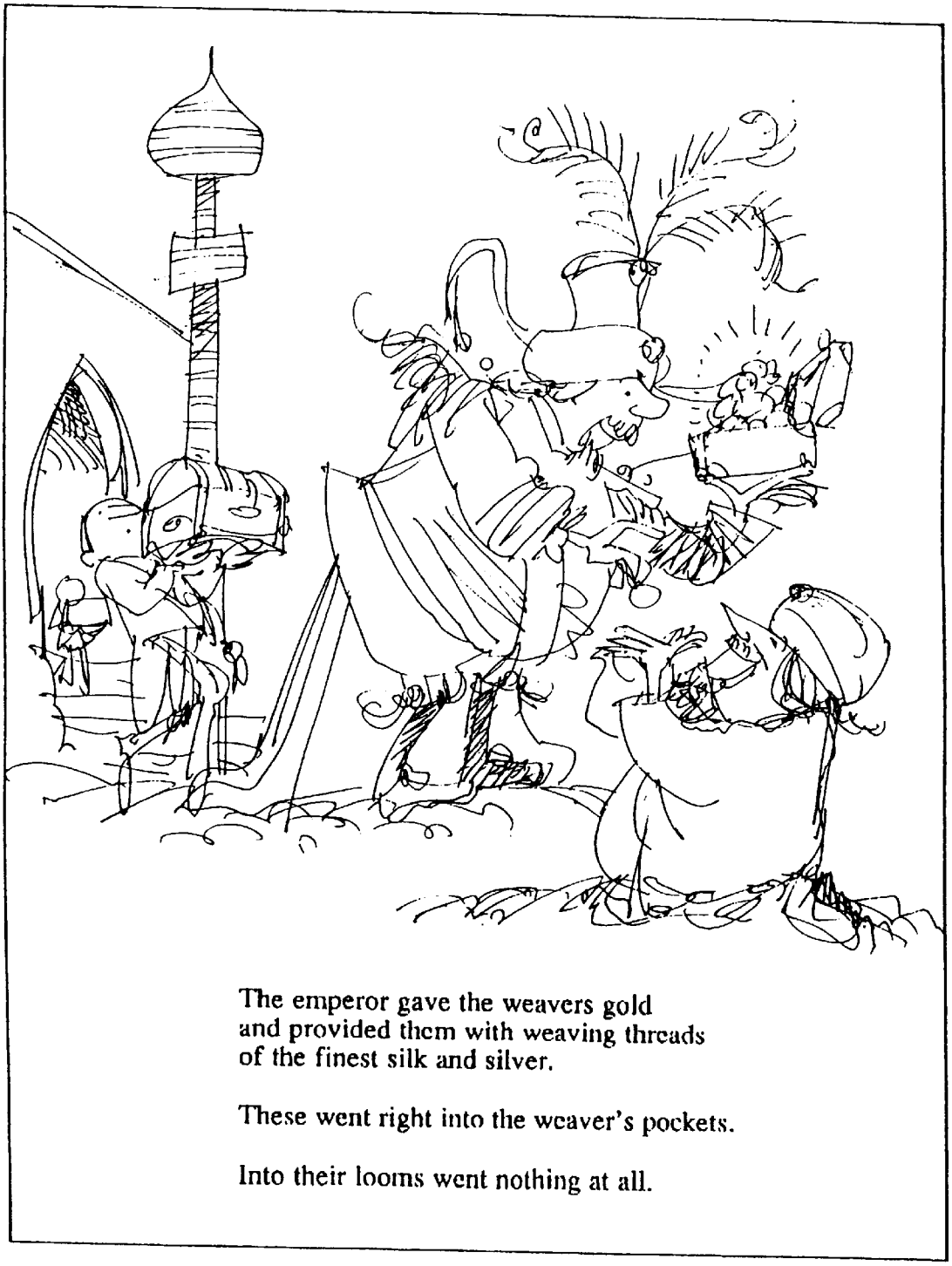
Figure 10:
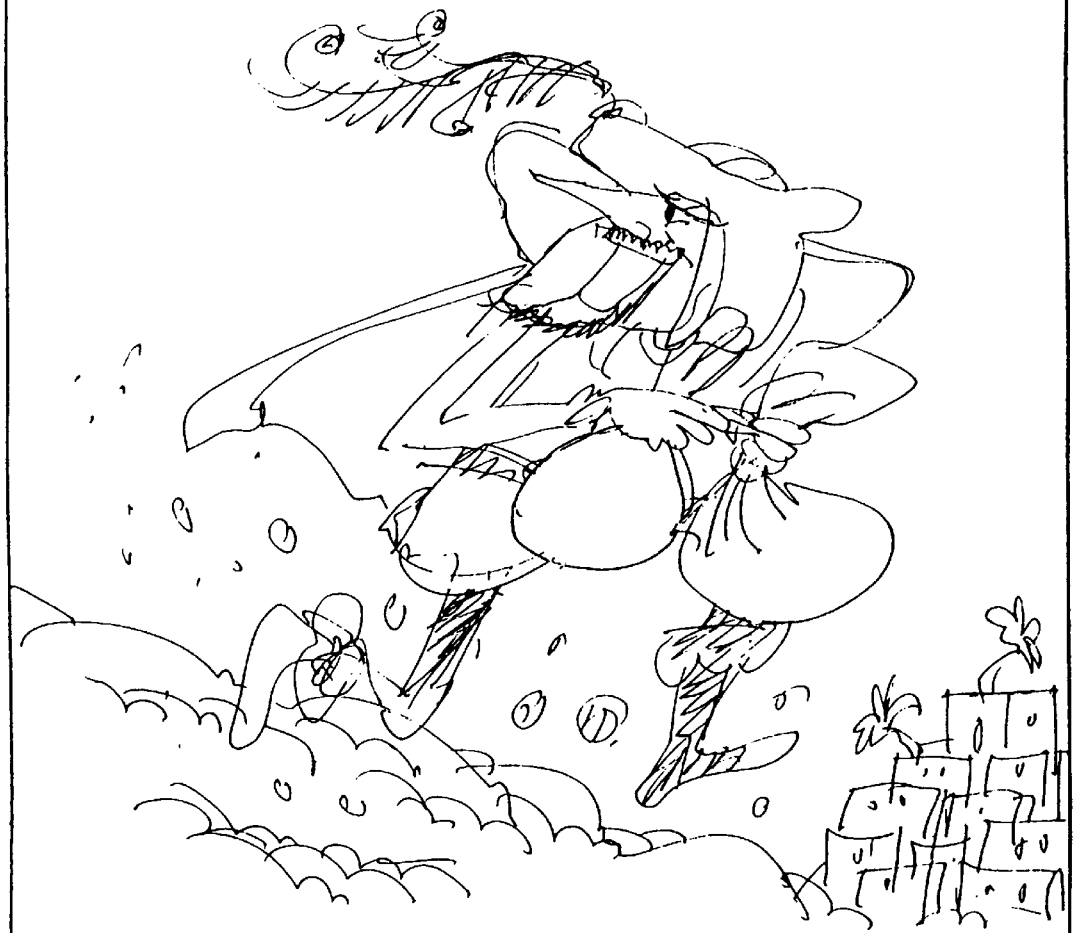
Figure 11:
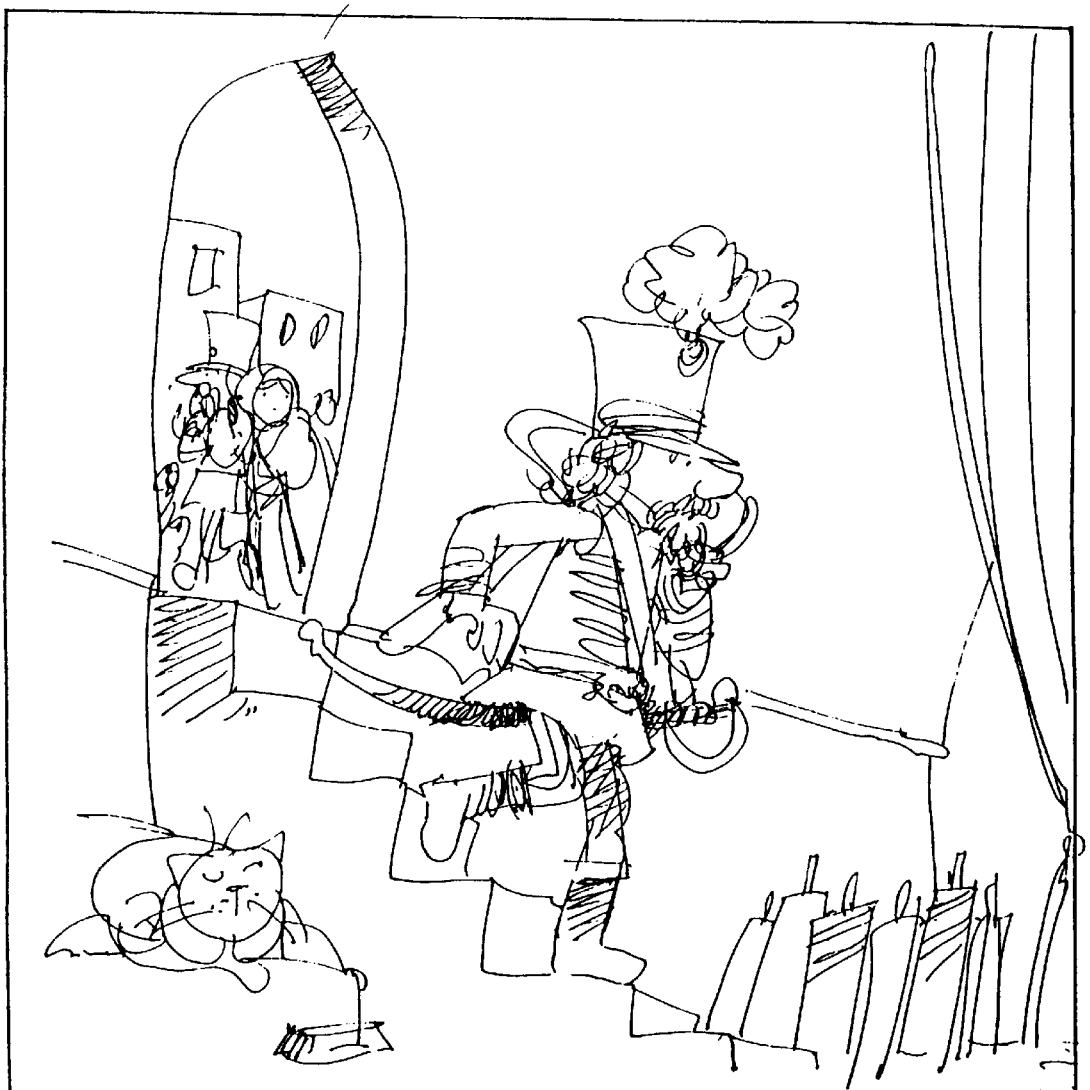
Figure 12:
Figure 13:
Figure 14:
Figure 15:
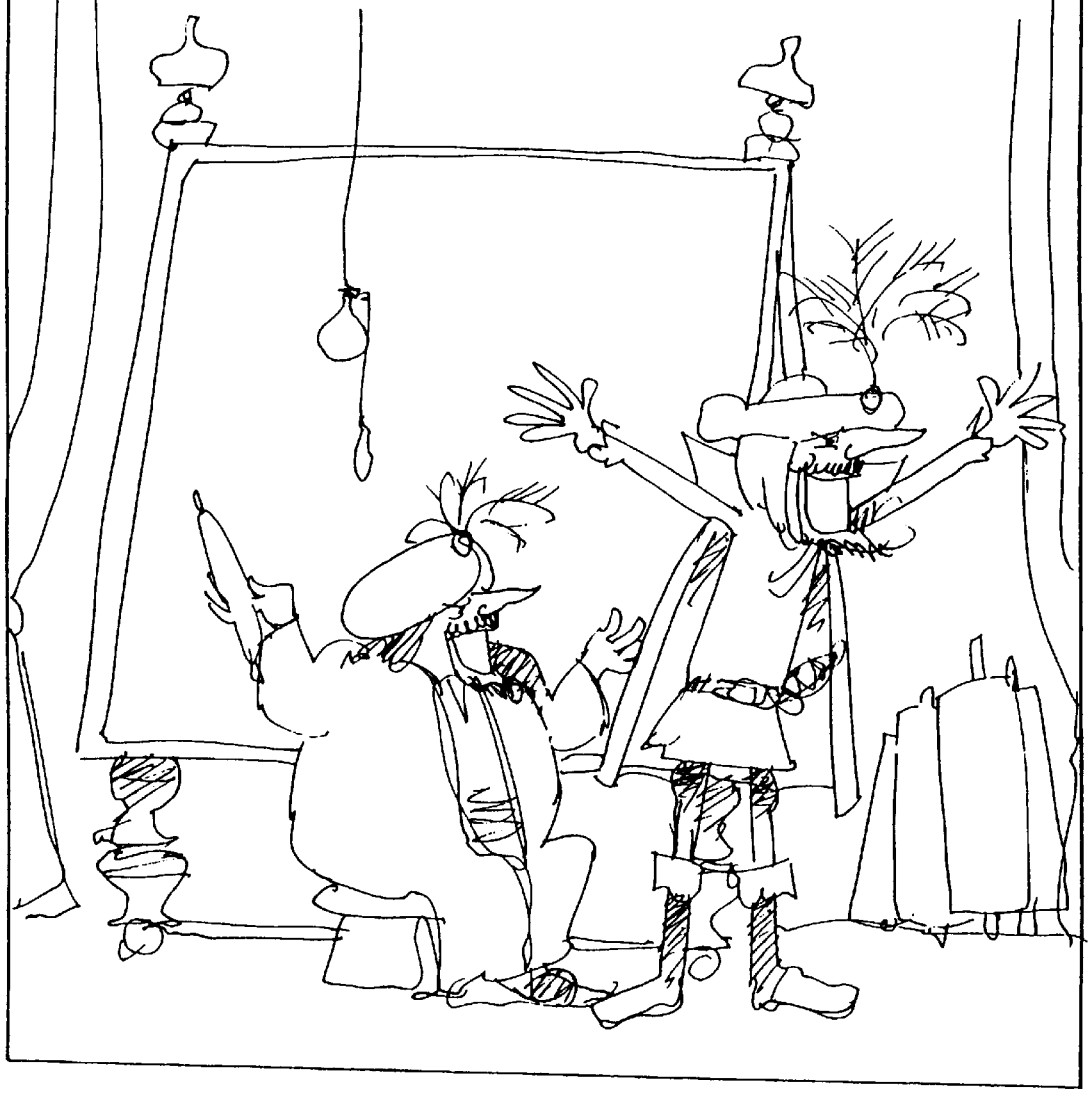
Figure 16:
Figure 17:
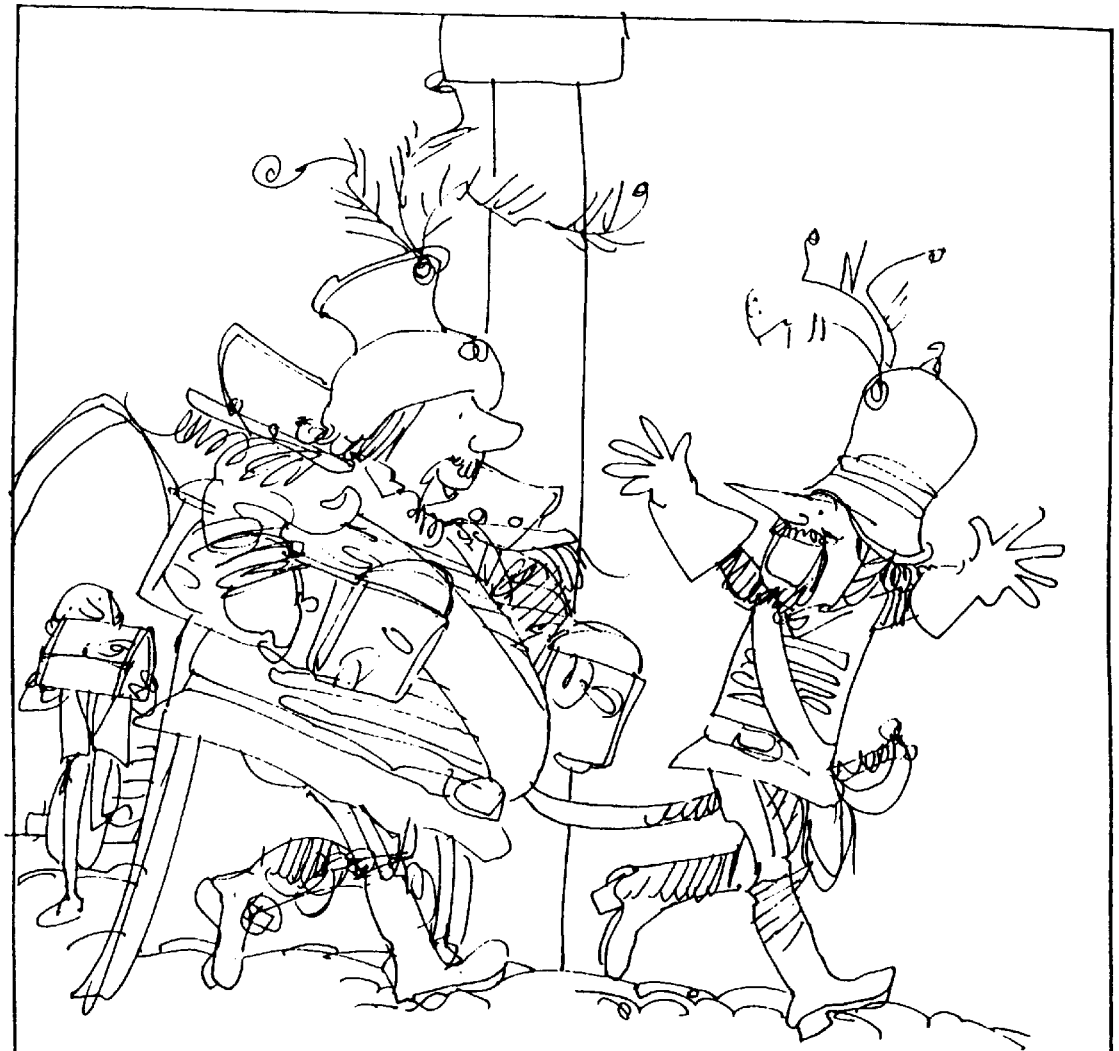
Figure 18:
Figure 19:
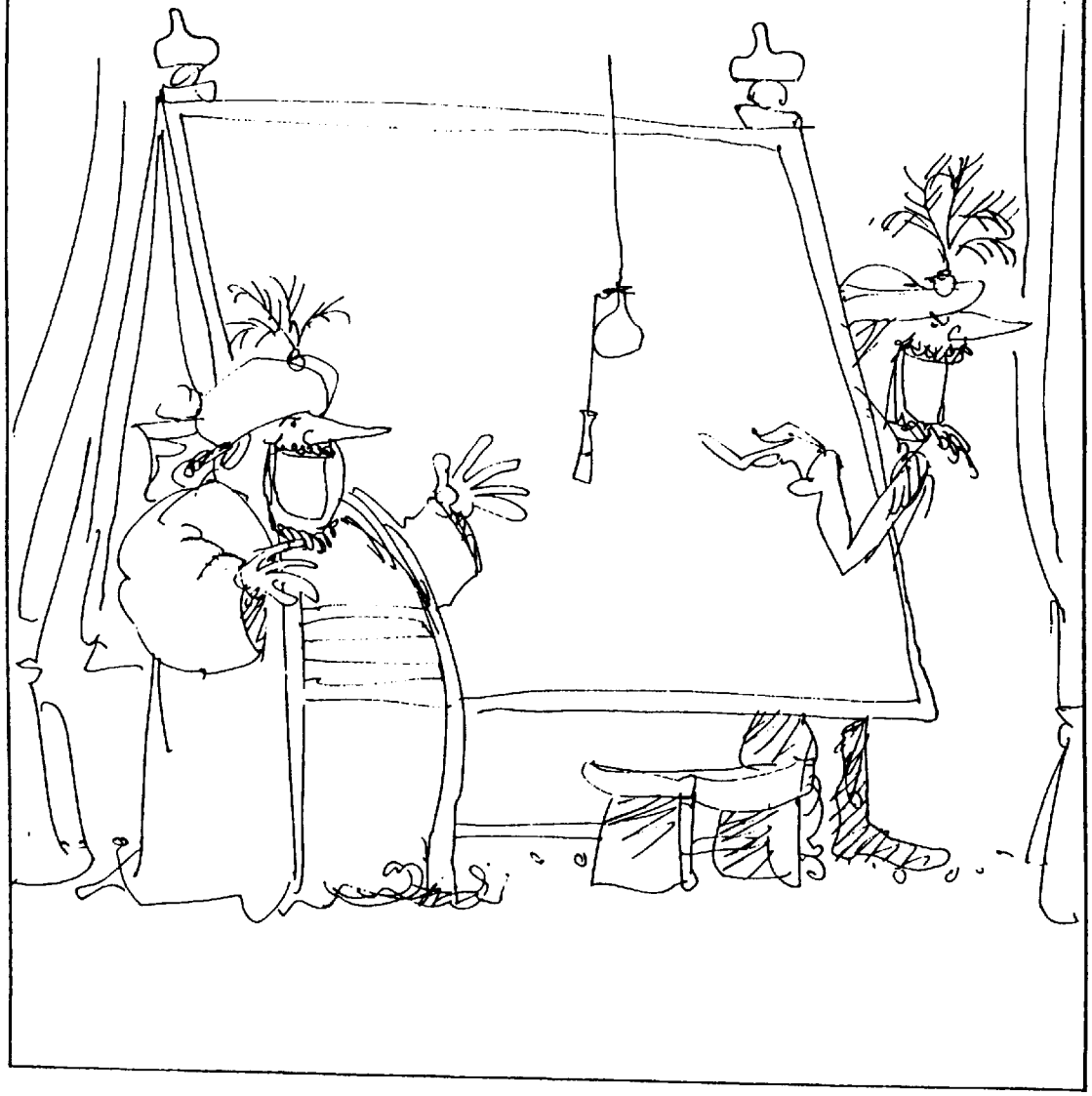
Figure 20:
Figure 21:
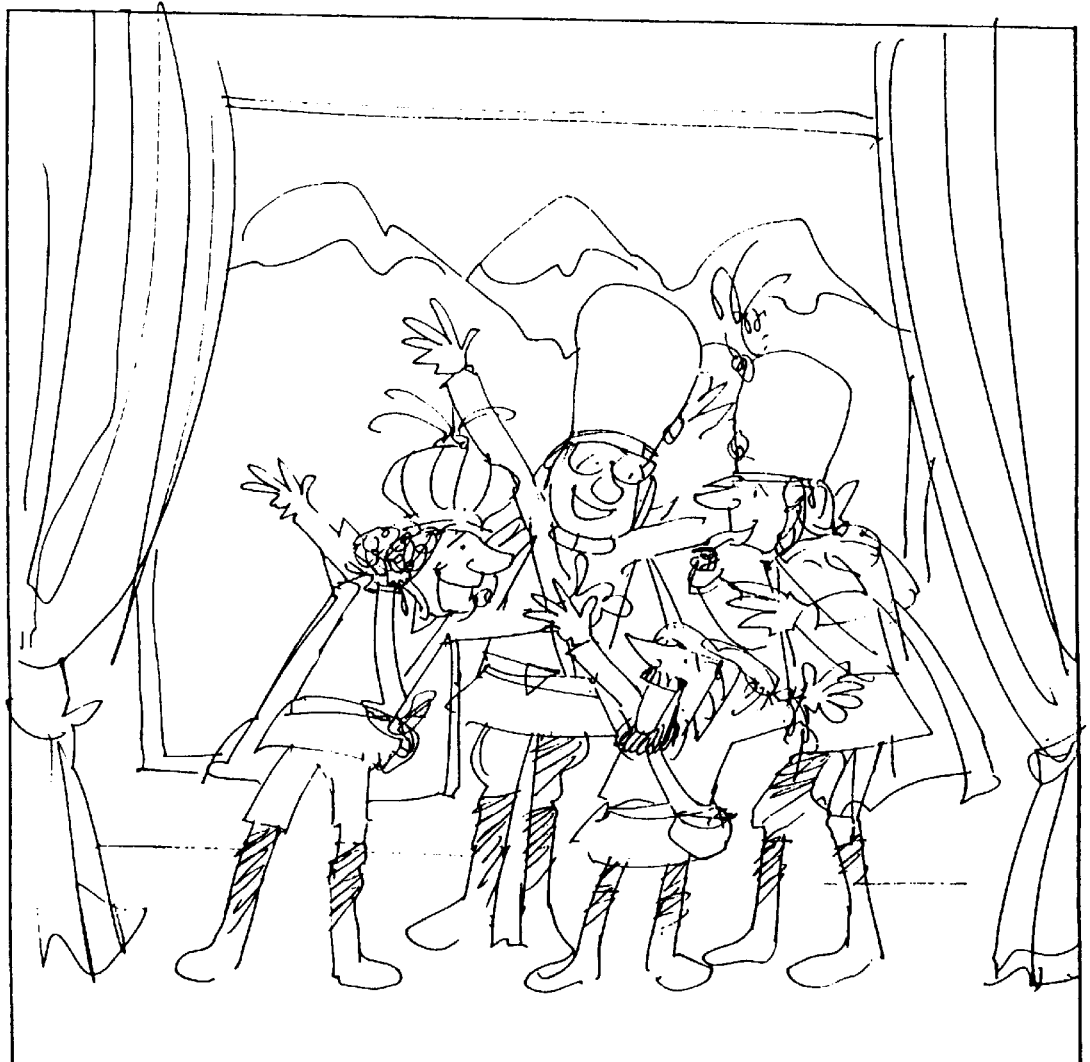
Figure 22:
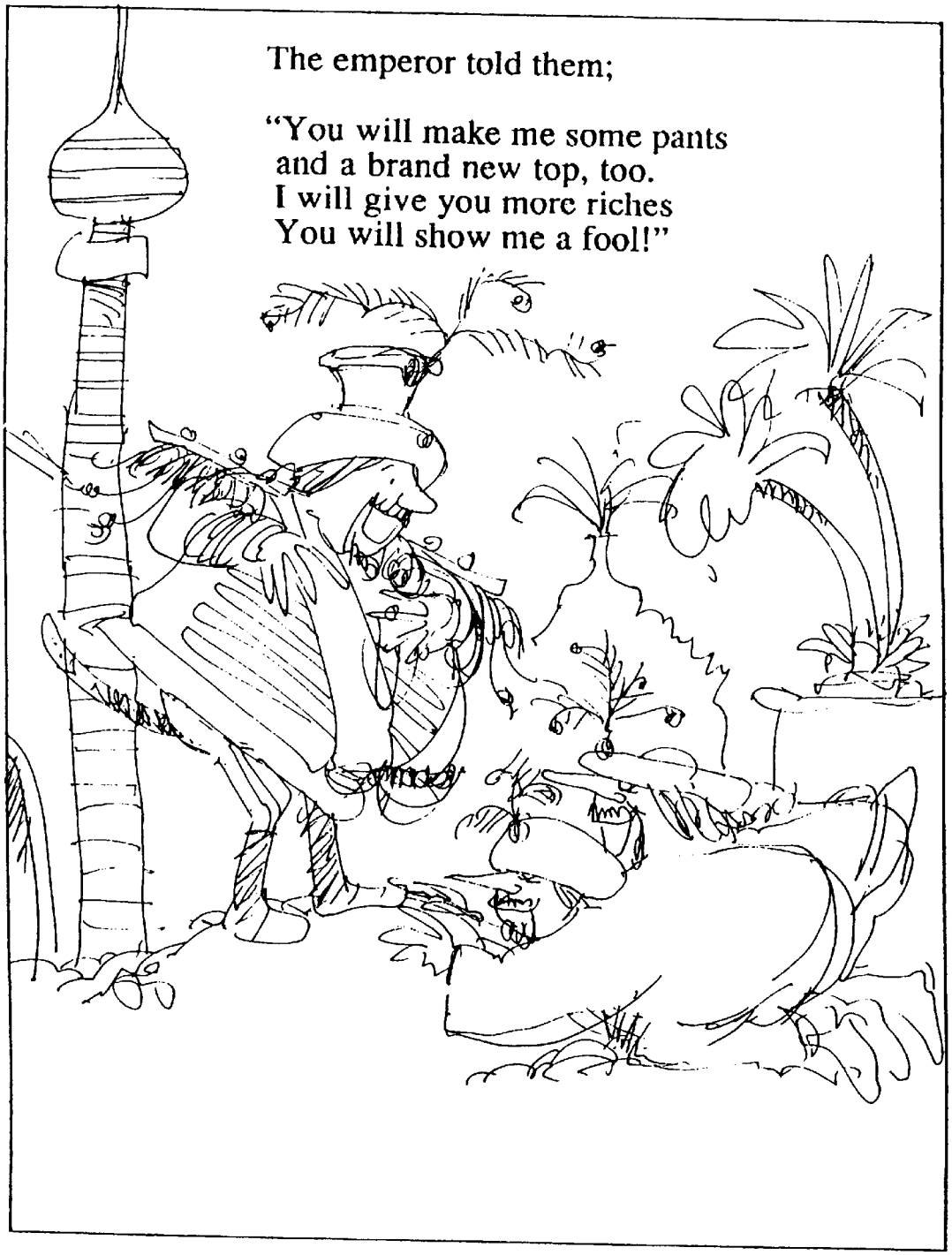
Figure 23:
Figure 24:
Figure 25:
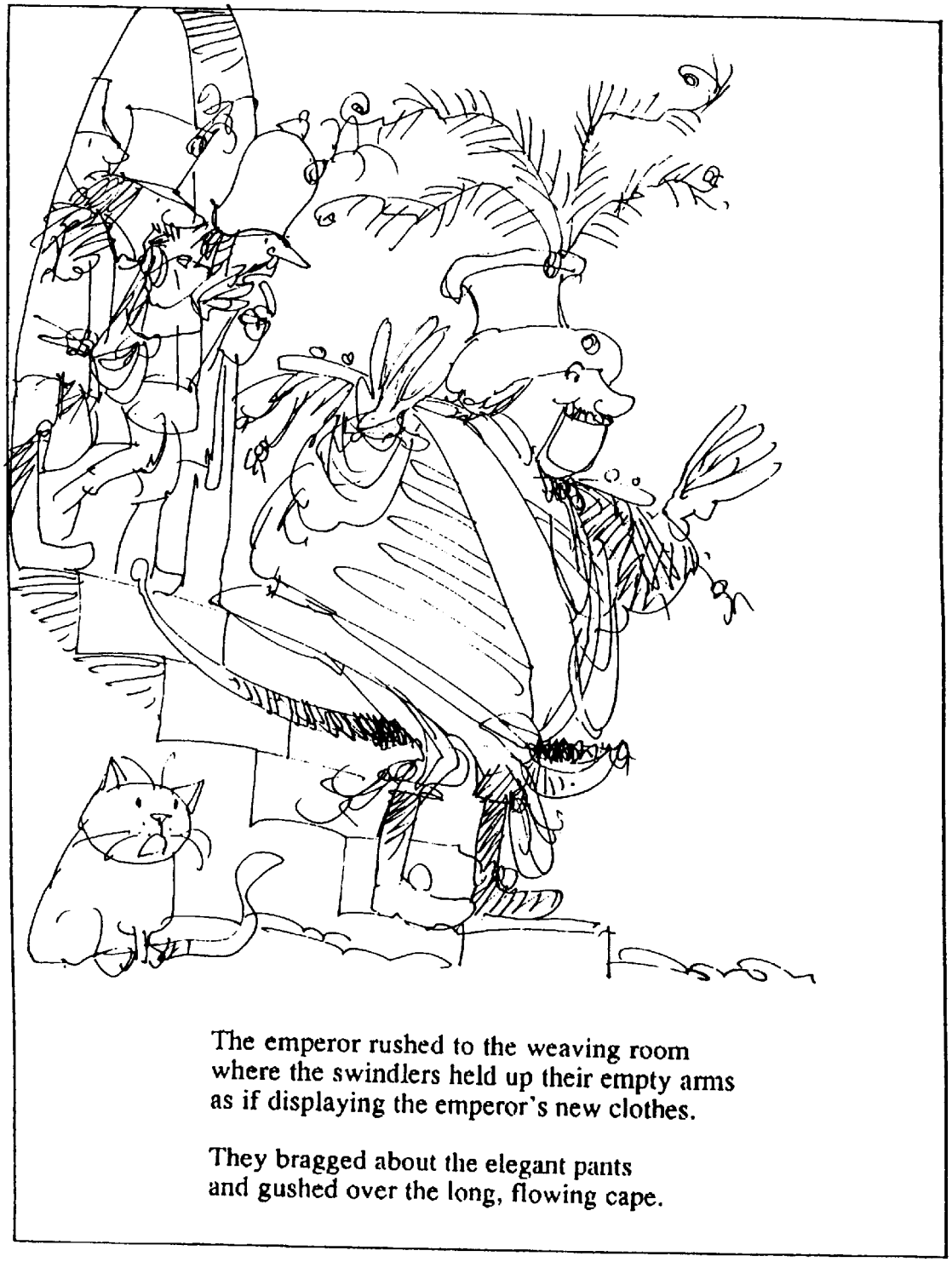
Figure 26:
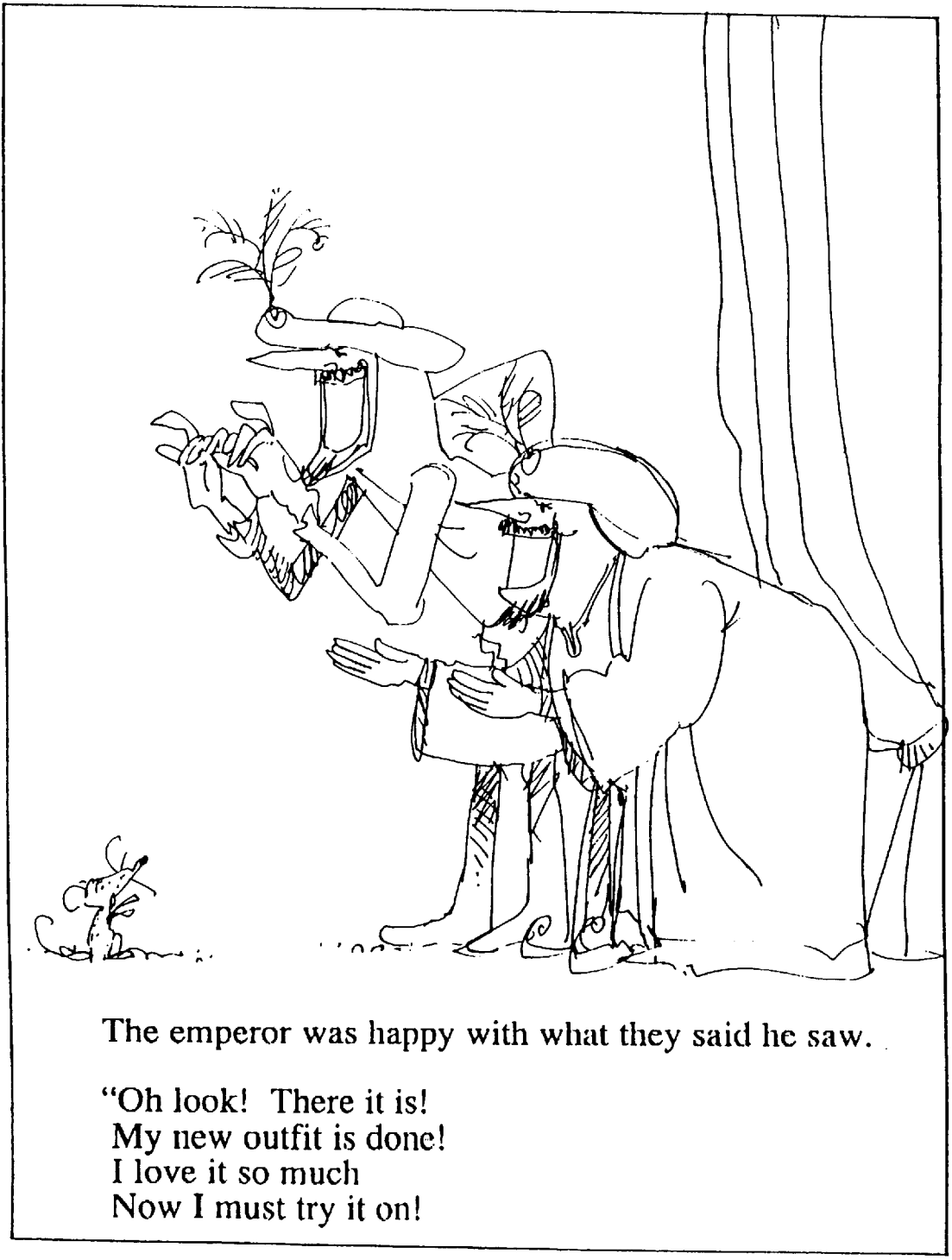
Figure 27:
Figure 28:
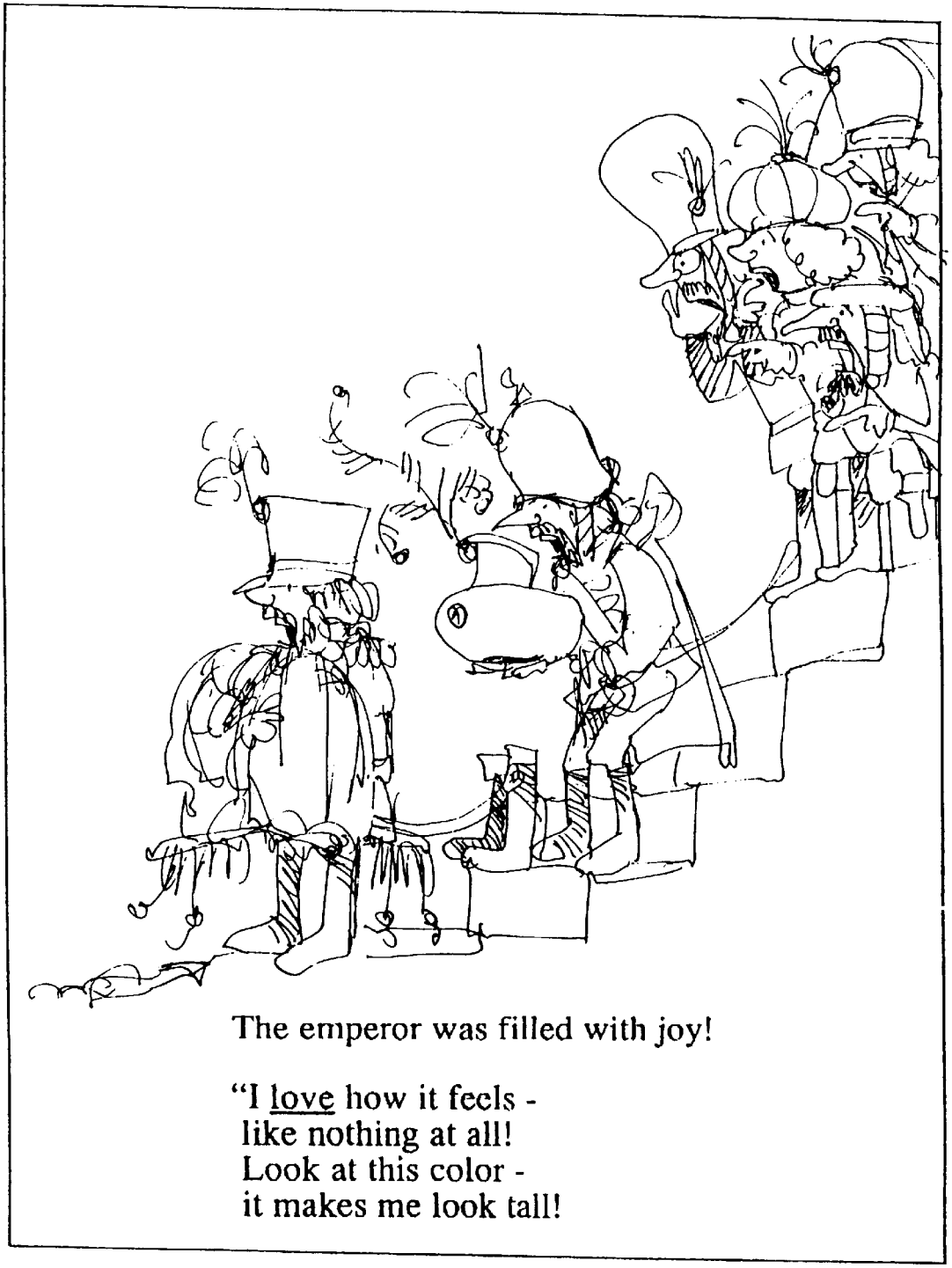
Figure 29:
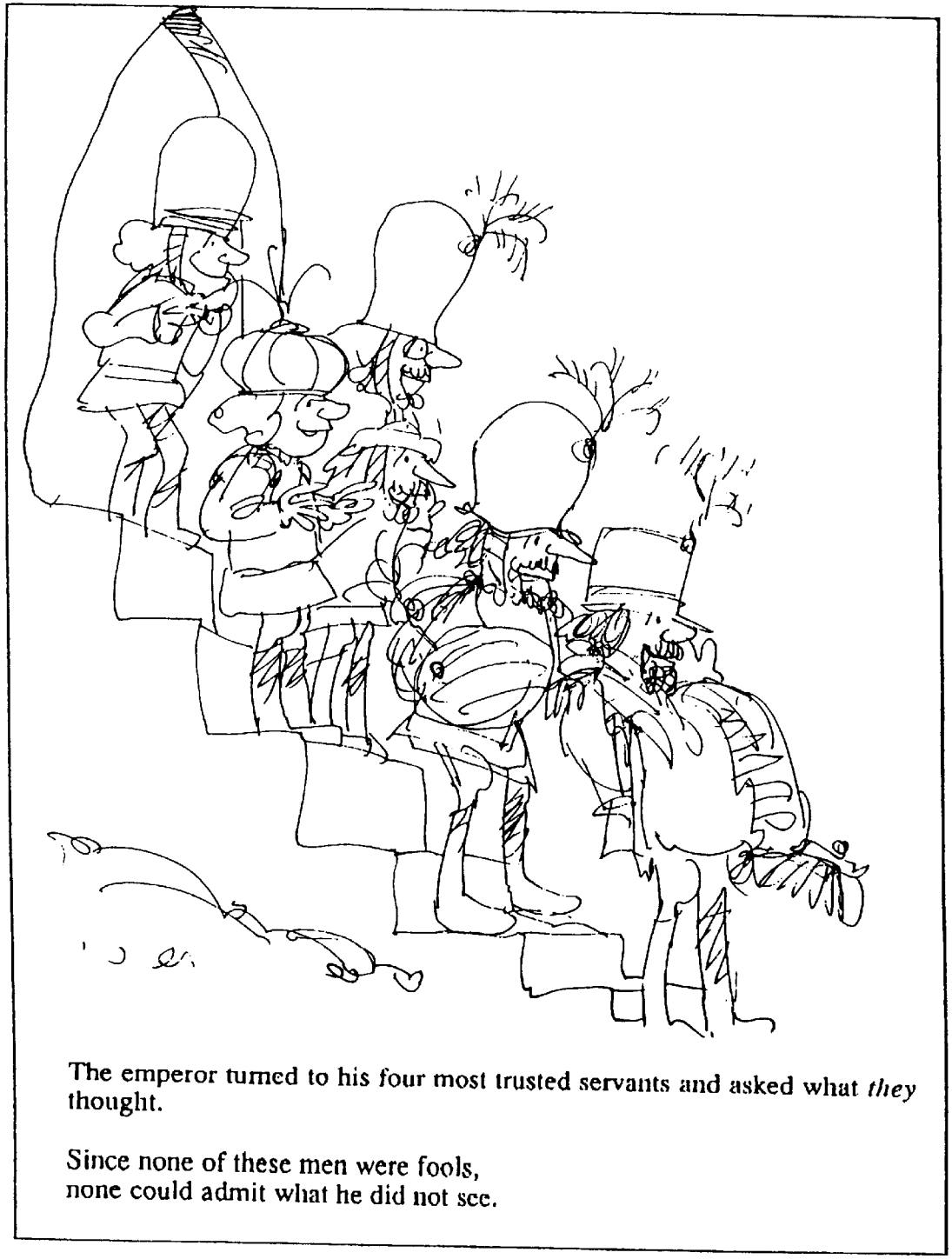
Figure 30:
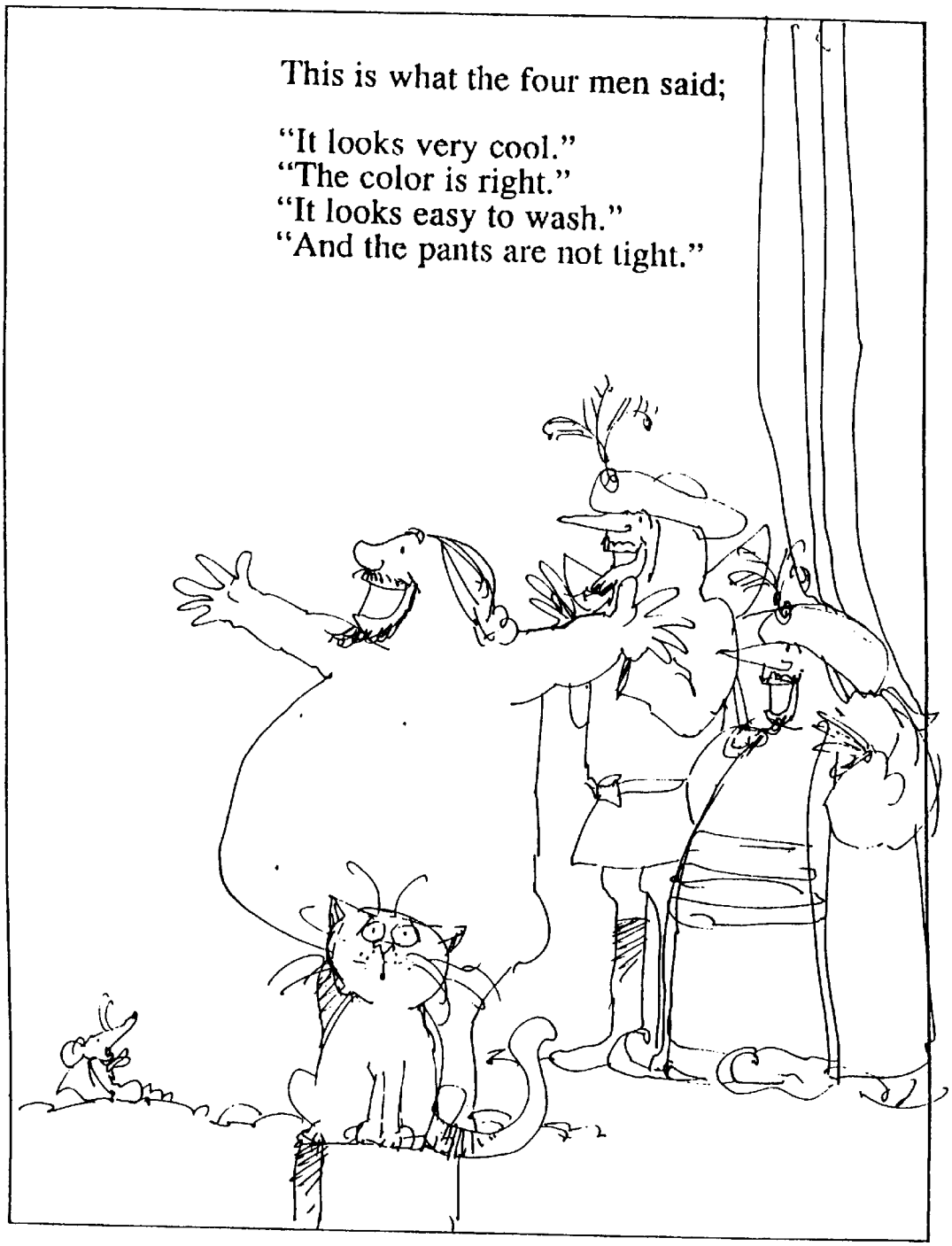
Figure 31:
Figure 32:
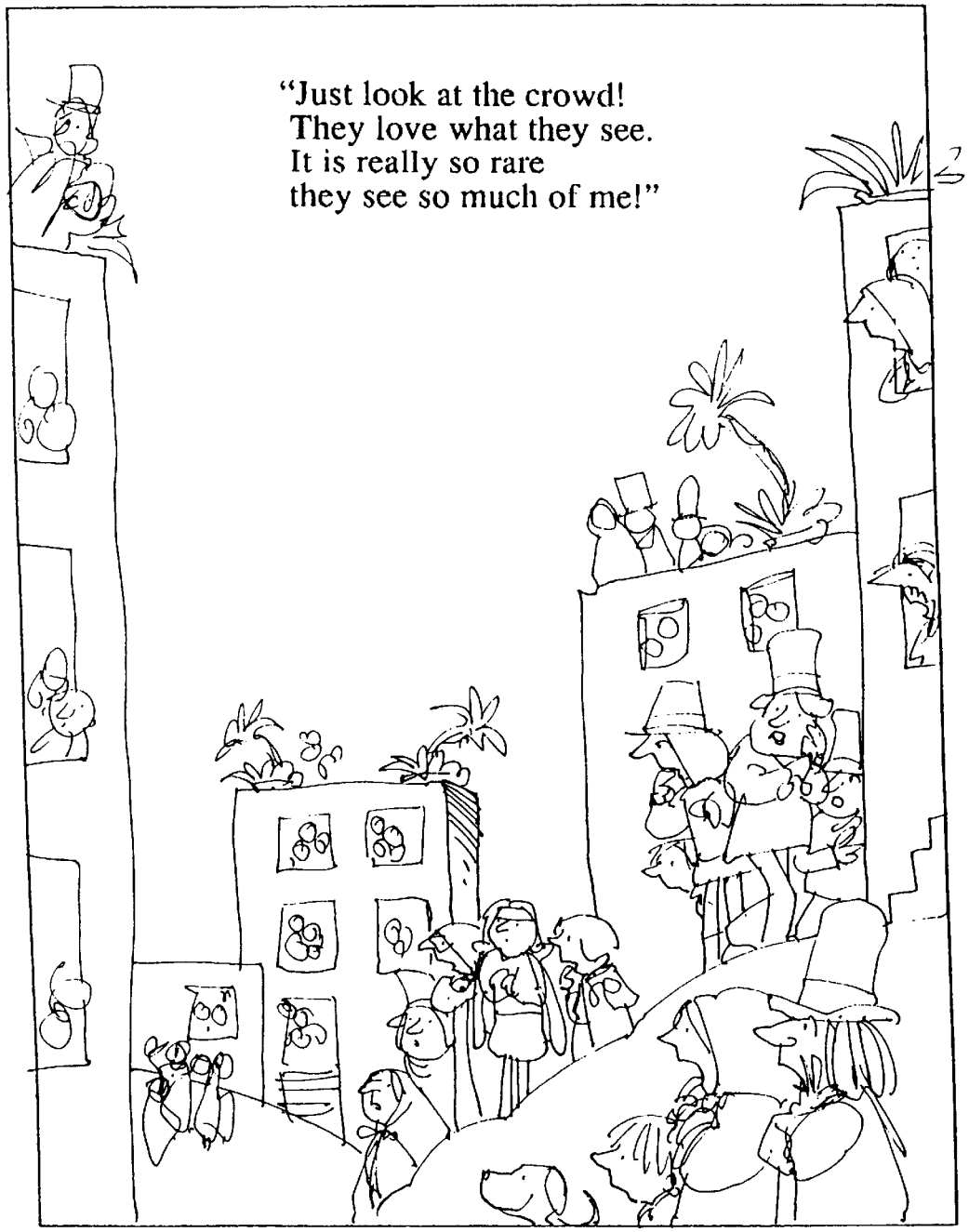
Figure 33:
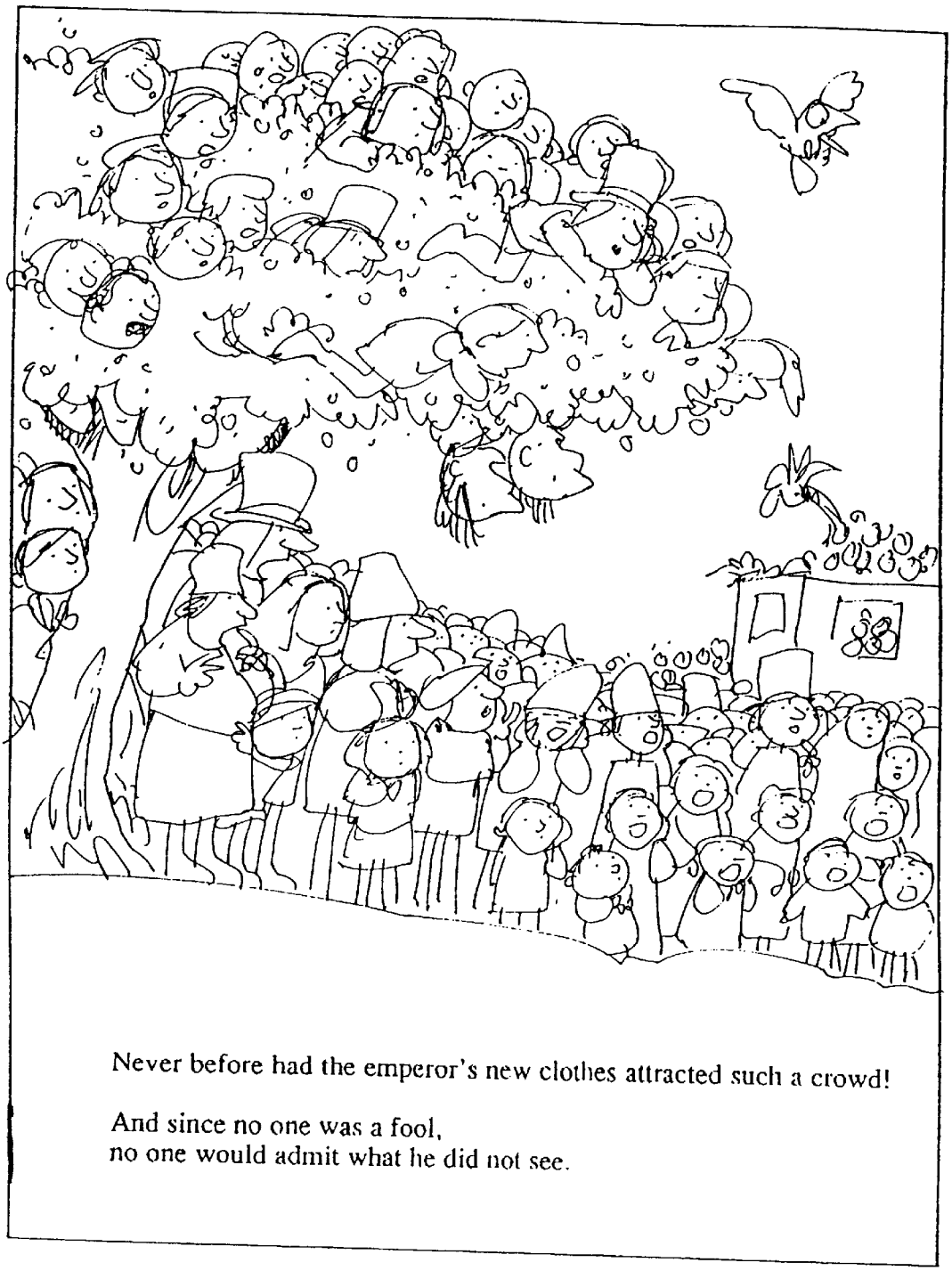
Figure 34:
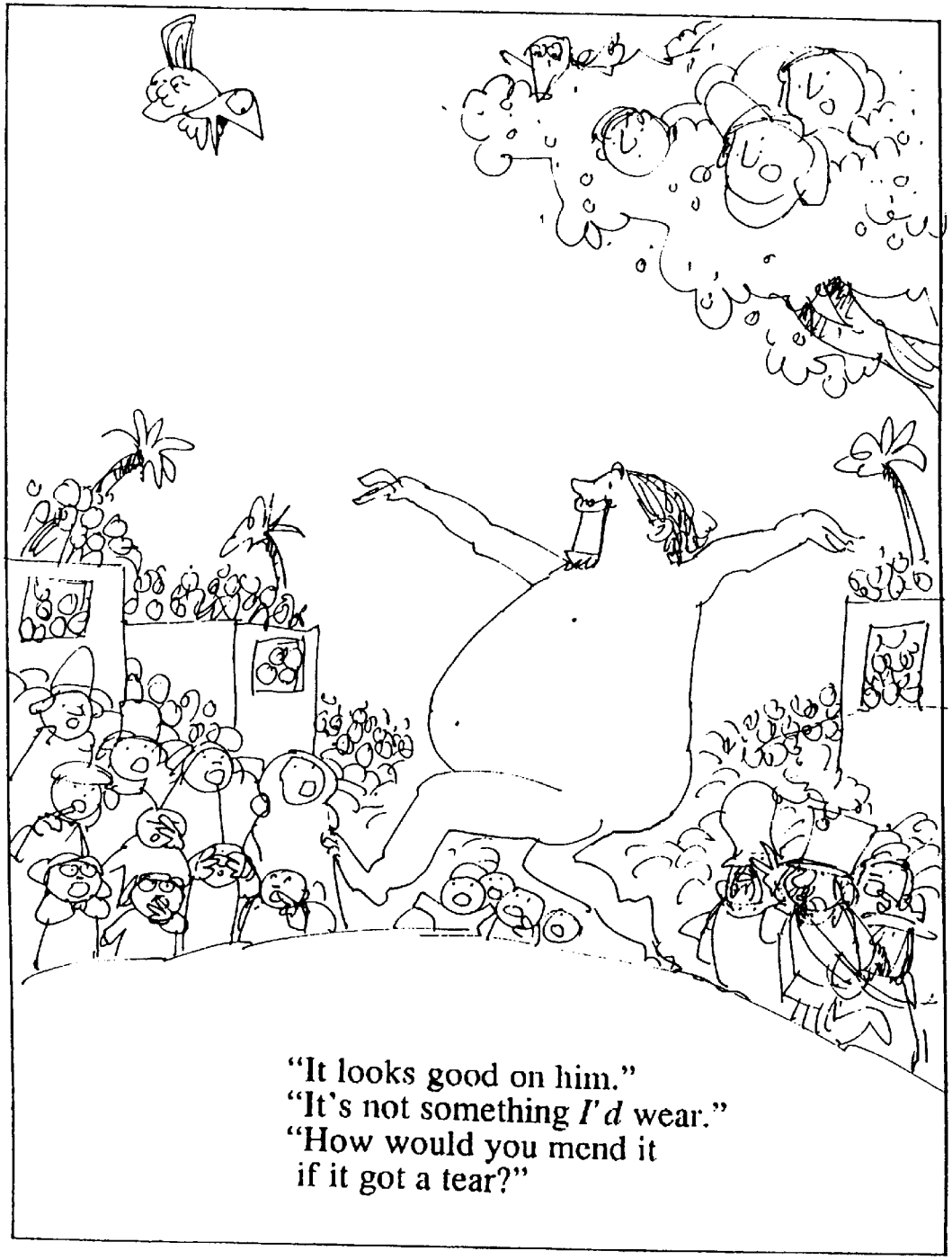
Figure 35:
Figure 36:
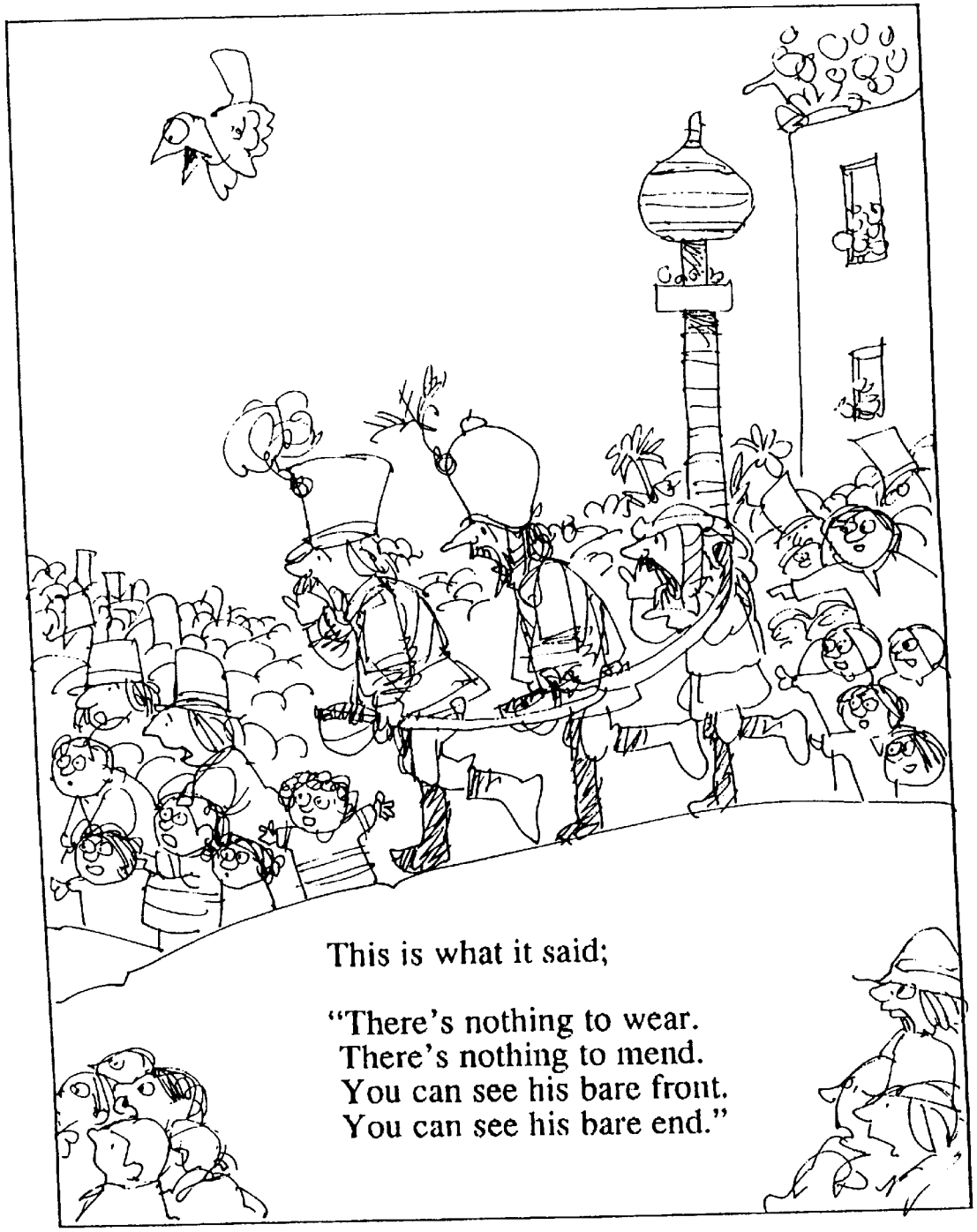
Figure 37:
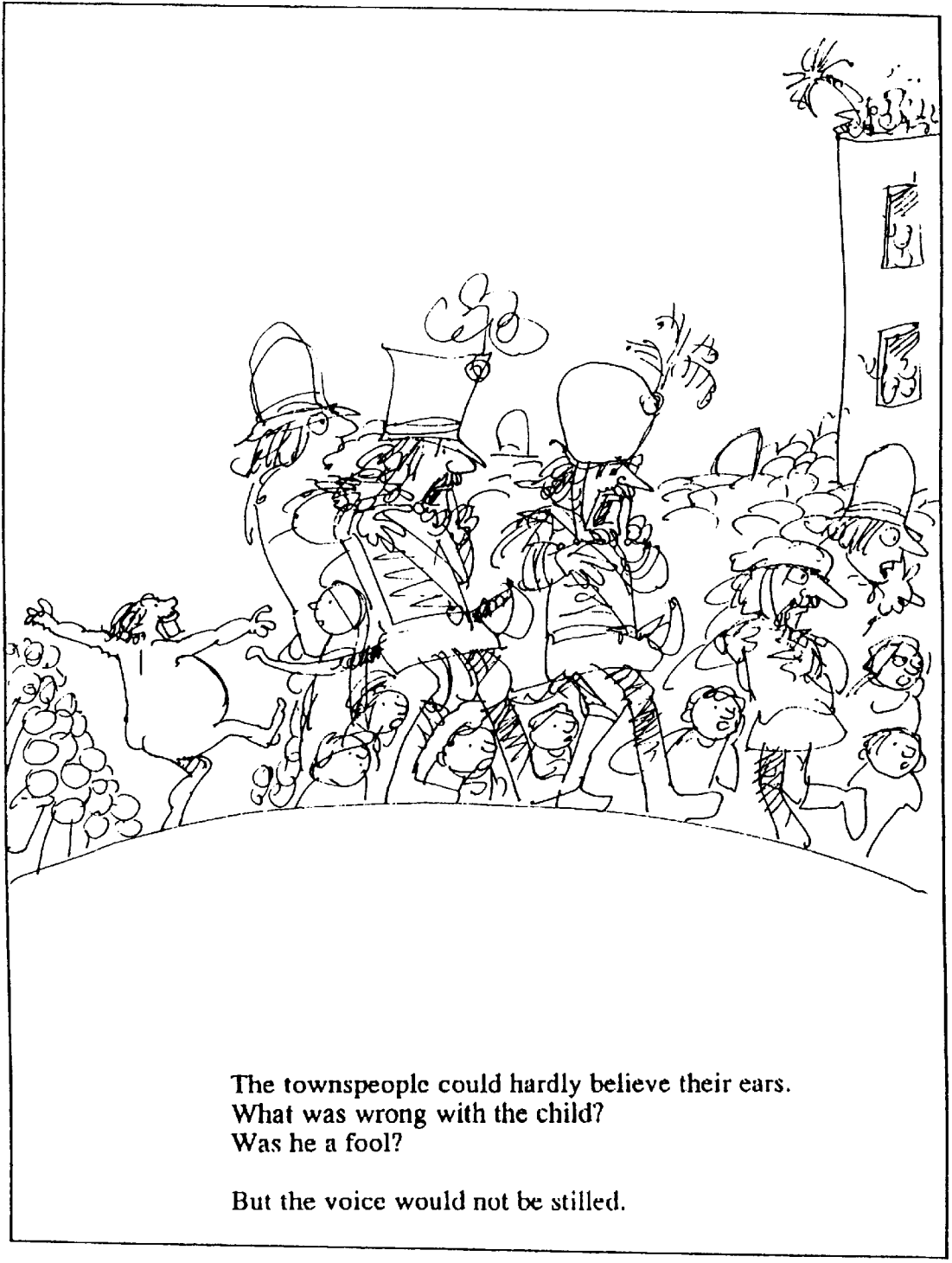
Figure 38:
Figure 39:
Figure 40:
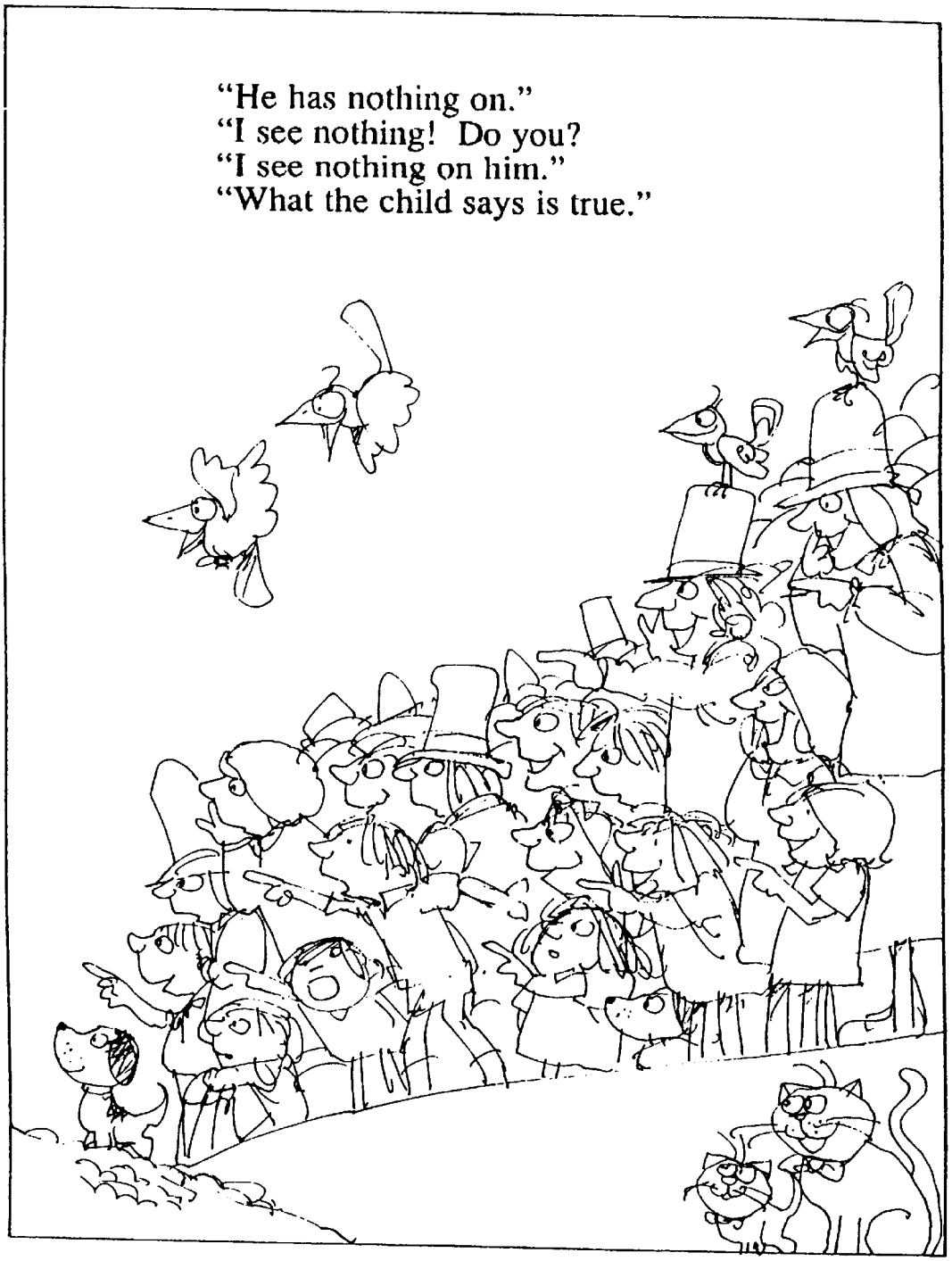
Figure 41:
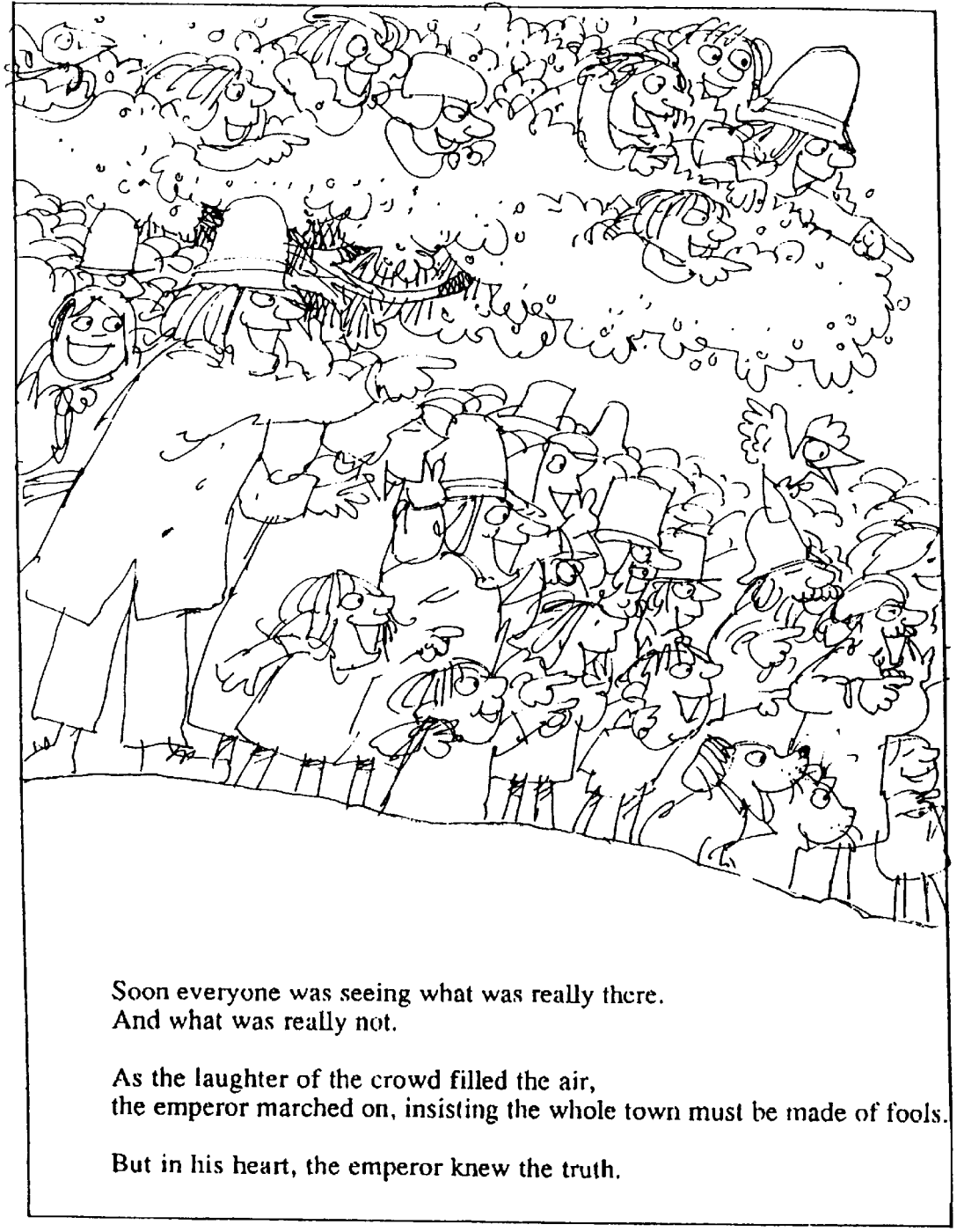
Figure 42:
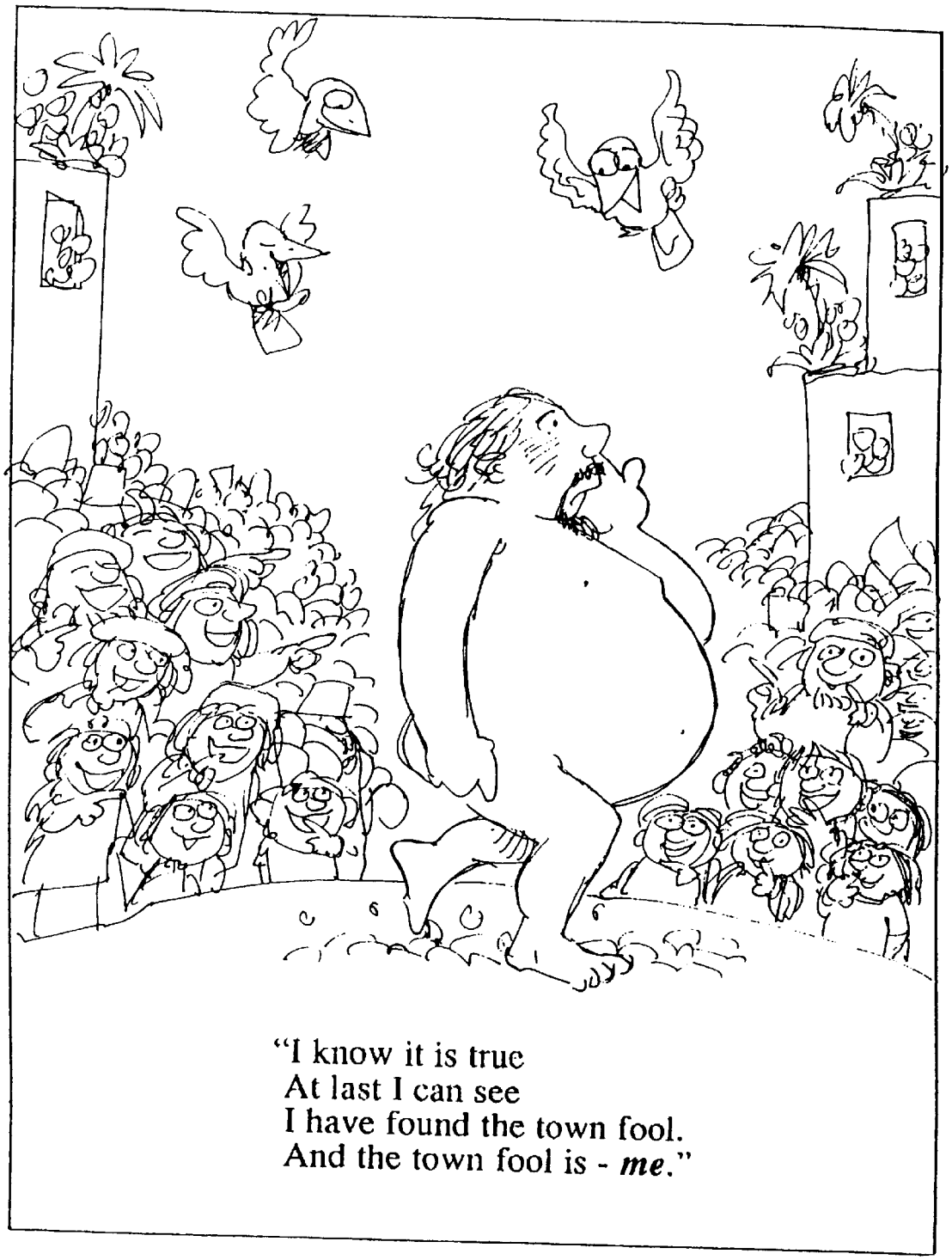

FIG. 3 shows a first page 12a of a book prepared according to the present invention. FIGS. 4–42 show the ensuing pages of the book which is forty pages in all. Throughout the book, pages having skilled reader's sections alternate with pages with novice reader's sections. The novice reader's sections are indicated by larger type size. The book presented in FIGS. 3–42 is an illustrated adaptation of the classic tale of "The Emperor's New Clothes." The book is copyrighted, and the book and all copyrights are owned by Treasure Bay, Inc. The copyright owner has no objection to the facsimile reproduction by anyone of the patent document or the patent disclosure, as it appears in the Patent and Trademark Office file or records, but otherwise reserves all copyright rights whatsoever.

While the present invention has been shown and described with reference to the foregoing preferred embodiment, it will be apparent to those skilled in the art that other changes in form and detail may be made therein without departing from the spirit and scope of the invention as defined in the appended claims.

I claim:

1. A series of books, each book comprising a plurality of pages with a first text arranged in sections on at least a portion of the pages, where the first text is at a selected reading level, and with a second text arranged in sections on at least a portion of the pages, where the second text is at a lesser reading level than the first text, where sections of the first and second texts are arranged in alternating sequence, and where the first and second texts together tell a continuous story, with each section of text forming a piece of the story and supplementing the preceding section of text so that persons of different reading abilities may together read a story with each person reading a substantial portion of the story and with each person observing the other person's reading, and where the first text is distinguished by a first indicia and the second text is distinguished by a second indicia different than the first indicia, and where every book in the series uses substantially the same first indicia to distinguish the first text and substantially the same second indicia to distinguish the second text.

2. The series of books of claim 1, wherein at least one of the first and second indicia includes a graphic symbol.

3. The series of books of claim 1, wherein either the first or second indicia comprises bold print for the corresponding text.

4. The series of books of claim 1, wherein the first indicia includes an adult's face and the second indicia includes a child's face.

5. The series of books of claim 1, wherein the first text and the second text are arranged on different pages.

6. The series of books of claim l, wherein the first text and the second text are arranged on alternating pages.

7. The series of books of claim 1, wherein the second text is associated with a picture representing at least a portion of the second text.

8. The series of books of claim 1, wherein at least one book of the series further comprises at least one illustration of at least a portion of the story.

9. The series of books of claim 1, wherein the first indicia includes printing the first text in a predetermined font size, and the second indicia includes printing the second text in a different font size and in bold print.

10. A book comprising a plurality of pages with a first text arranged in sections on at least a portion of the pages, where the first text is at a selected reading level, and with a second text arranged in sections on at least a portion of the pages, where the second text is at a lesser reading level than the first text, where sections of the first and second texts are arranged in alternating sequence, and where the first and second texts together tell a plurality of stories, with each section of text forming a piece of each story and supplementing the preceding section of text so that persons of different reading abilities may together read the stories with each person reading a substantial portion of each story and with each person observing the other person's reading, and further where the first text is distinguished by a first indicia and the second text is distinguished by a second indicia different than the first indicia, and where every story in the book uses substantially the same first indicia to distinguish the first text and substantially the same second indicia to distinguish the second text.

11. The book of claim 10, wherein at lest one of the first and second indicia includes a graphic symbol.

12. The book of claim 10, wherein either the first or second indicia comprises bold print for the corresponding text.

13. The book of claim 10, wherein the first indicia includes an adult's face and the second indicia includes a child's face.

14. The book of claim 10, wherein the first text and the second text are arranged on different pages.

15. The book of claim 10, wherein the first text and the second text are arranged on alternating pages.

16. The book of claim 10, wherein the second text is associated with a picture representing at least a portion of the second text.

17. The book of claim 10, further comprising at least one illustration of at least a portion of at least one story.

18. The book of claim 10, wherein the first indicia includes printing the first text in a predetermined font size, and the second indicia includes printing the second text in a different font size and in bold print.

* * * * *